United States Patent
Kitahara et al.

(10) Patent No.: US 10,536,488 B2
(45) Date of Patent: Jan. 14, 2020

(54) RECEIVING DEVICE, RECEPTION METHOD, TRANSMITTING DEVICE, AND TRANSMISSION METHOD

(71) Applicant: Saturn Licensing LLC, New York, NY (US)

(72) Inventors: Jun Kitahara, Shizuoka (JP); Naohisa Kitazato, Tokyo (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 83 days.

(21) Appl. No.: 15/124,192

(22) PCT Filed: Feb. 27, 2015

(86) PCT No.: PCT/JP2015/055745
§ 371 (c)(1),
(2) Date: Sep. 7, 2016

(87) PCT Pub. No.: WO2015/137149
PCT Pub. Date: Sep. 17, 2015

(65) Prior Publication Data
US 2017/0019431 A1 Jan. 19, 2017

(30) Foreign Application Priority Data
Mar. 14, 2014 (JP) .................................. 2014-050927

(51) Int. Cl.
*G06F 15/16* (2006.01)
*H04L 29/06* (2006.01)
(Continued)

(52) U.S. Cl.
CPC ...... *H04L 65/1066* (2013.01); *H04L 61/2007* (2013.01); *H04L 65/4076* (2013.01);
(Continued)

(58) Field of Classification Search
CPC .................................................. H04L 61/2007
(Continued)

(56) References Cited

U.S. PATENT DOCUMENTS

2009/0222871 A1 9/2009 Schaefer et al.
2011/0289542 A1 11/2011 Kitazato et al.
(Continued)

FOREIGN PATENT DOCUMENTS

CN 1906947 1/2007
JP 2012-156712 A 8/2012
(Continued)

OTHER PUBLICATIONS

International Search Report dated Jun. 2, 2015 in PCT/JP2015/055745 Filed Feb. 27, 2015.
(Continued)

*Primary Examiner* — Wing F Chan
*Assistant Examiner* — Andrew Woo
(74) *Attorney, Agent, or Firm* — Oblon, McClelland, Maier & Neustadt, L.L.P.

(57) ABSTRACT

The present technology relates to a receiving device, a reception method, a transmitting device, and a transmission method capable of performing an effective filtering process. There is provided a receiving device including a filtering processing unit that performs a filtering process of a packet by using filtering information arranged in a header of the packet transmitted in a first layer that is a layer upper than an IP layer in layers of a protocol of the IP transmission system in a broadcasting wave of digital broadcasting using an IP transmission system. The present technology, for example, can be applied to a television set.

21 Claims, 24 Drawing Sheets

(51) Int. Cl.
  *H04L 29/12*  (2006.01)
  *H04L 29/08*  (2006.01)
(52) U.S. Cl.
  CPC .............. *H04L 69/16* (2013.01); *H04L 69/22* (2013.01); *H04L 69/326* (2013.01)
(58) Field of Classification Search
  USPC ........................................................ 709/217
  See application file for complete search history.

(56) References Cited

U.S. PATENT DOCUMENTS

| | | | |
|---|---|---|---|
| 2012/0303745 A1* | 11/2012 | Lo ......................... | H04W 4/021 709/217 |
| 2013/0219431 A1* | 8/2013 | Hong ..................... | H04H 20/42 725/54 |
| 2013/0282870 A1 | 10/2013 | Dewa et al. | |
| 2013/0332975 A1* | 12/2013 | Song ................... | H04N 21/235 725/110 |
| 2015/0146746 A1 | 5/2015 | Cheang | |

FOREIGN PATENT DOCUMENTS

| | | |
|---|---|---|
| WO | 2010/090162 A1 | 8/2010 |
| WO | 2013/157440 A1 | 10/2013 |

OTHER PUBLICATIONS

Office Action dated Nov. 5, 2018 in Chinese Patent Application No. 201580012373.3 (With English Translation).

* cited by examiner

FIG. 5

| ELEMENT | DESCRIPTION |
|---|---|
| V | VERSION OF LCT PACKET |
| C | FLAG REPRESENTING Length OF Congestion Control Information |
| PSI | BIT SETTING Protocol Specific Information |
| S | FLAG REPRESENTING Length OF TSI |
| O | FLAG REPRESENTING Length OF CO + Type + Filter_Extension + Data_Version |
| H | FLAG REPRESENTING Length (Half) OF CO + Type + Filter_Extension + Data_Version |
| Res | Reserved |
| A | FLAG REPRESENTING END OF SESSION |
| B | FLAG REPRESENTING END OF OBJECT |
| HDR_LEN | HEADER Length |
| CP | Code Point VALUE. SPECIFIC METHOD OF USING Code Point IS BASED ON OPERATION |
| CCI | Congestion Control Information |
| TSI | Transport Session Identification. ID IDENTIFYING SESSION |
| CO | REPRESENTING COMPRESSION (ALGORITHM)/NON-COMPRESSION OF SIGNALING DATA |
| Type | TYPE OF SIGNALING DATA |
| Filter_Extension | FILTERING CONDITION SET FOR EACH Type |
| Data_Version | VERSION OF SIGNALING DATA |
| Header Extensions | EXTENDED HEADER |

FIG. 6

| O | H | Total length (bit) | CO (bit) | Type (bit) | Filter_Extension(bit) | Data_Version (bit) |
|---|---|---|---|---|---|---|
| 00 | 1 | 16 | 2 | 8 | 0 | 6 |
| 01 | 0 | 32 | 2 | 8 | 6 | 16 |
| 01 | 1 | 48 | 2 | 8 | 22 | 16 |
| 10 | 0 | 64 | 2 | 8 | 38 | 16 |
| 10 | 1 | 80 | 2 | 16 | 46 | 16 |
| 11 | 0 | 96 | 2 | 16 | 62 | 16 |
| 11 | 1 | 112 | 2 | 16 | 78 | 16 |

FIG. 7

| Type | Signaling |
|---|---|
| 1 | All |
| 2 | ESG |
| 3 | USBD |
| 4 | FDD |
| 5 | MPD |
| 6 | SDP |
| 7 | SPD |

FIG. 10

| ELEMENT | DESCRIPTION |
|---|---|
| V | VERSION OF LCT PACKET |
| C | FLAG REPRESENTING Length OF Congestion Control Information |
| PSI | BIT SETTING Protocol Specific Information |
| S | FLAG REPRESENTING Length OF TSI |
| O | FLAG REPRESENTING Length OF TOI |
| H | FLAG REPRESENTING Length (Half) OF TOI AND TSI |
| Res | Reserved |
| A | FLAG REPRESENTING END OF SESSION |
| B | FLAG REPRESENTING END OF OBJECT |
| HDR_LEN | HEADER Length |
| CP | Code Point VALUE. SPECIFIC METHOD OF USING Code Point IS BASED ON OPERATION |
| CCI | Congestion Control Information |
| TSI | Transport Session Identification. ID IDENTIFYING SESSION |
| TOI | Transport Object Identification. ID IDENTIFYING OBJECT |
| Header Extensions | EXTENDED HEADER |
| CO | REPRESENTING COMPRESSION (ALGORITHM/NON-COMPRESSION OF SIGNALING DATA |
| Type | TYPE OF SIGNALING DATA |
| Filter_Extension | FILTERING CONDITION SET FOR EACH Type |
| Data_Version | DATA VERSION OF SIGNALING DATA |

RECEIVING DEVICE, RECEPTION METHOD, TRANSMITTING DEVICE, AND TRANSMISSION METHOD

TECHNICAL FIELD

The present technology relates to a receiving device, a reception method, a transmitting device, and a transmission method, and particularly, to a receiving device, a reception method, a transmitting device, and a transmission method capable of performing an effective filtering process.

BACKGROUND ART

In digital broadcasting standards of each country, a Moving Picture Experts Group phase 2-Transport Stream (MPEG2-TS) system is employed as a transmission format (for example, see Patent Document 1). In the future, it is assumed to provide more advanced services by introducing an IP transmission system using Internet Protocol (IP) packets, used in the field of communication for digital broadcasting.

CITATION LIST

Patent Document

Patent Document 1: Japanese Patent Application Laid-Open No. 2012-156712

BRIEF SUMMARY OF THE INVENTION

Problems to be Solved by the Invention

However, in digital broadcasting using an IP transmission system, various kinds of data are transmitted in units of packets, and accordingly, it is requested to acquire necessary information by performing an effective packet filtering process. However, a technology system relating to such a filtering process has not been established.

The present technology is in consideration of such situations and enables an effective filtering process in digital broadcasting using an IP transmission system.

Solutions to Problems

A receiving device according to a first aspect of the present technology includes: a reception unit that receives a broadcasting wave of digital broadcasting using an Internet Protocol (IP) transmission system; and a filtering processing unit that performs a filtering process of a packet by using filtering information arranged in a header of the packet transmitted in a first layer that is a layer upper than an IP layer in layers of a protocol of the IP transmission system in the broadcasting wave.

The packet may be a Layered Coding Transport (LCT) packet transmitted using a File Delivery over Unidirectional Transport (FLUTE) session, the filtering information, in the LCT packet, maybe arranged in an LCT header, and first signaling data may be arranged in an LCT payload, and the filtering processing unit, after resolving an IP address, a port number of a User Datagram Protocol (UDP), and a Transport Session Identifier (TSI) of a specific service using second signaling data transmitted in a second layer that is a layer lower than the IP layer, may perform a filtering process of the first signalling data stored in the LCT packet using the filtering information arranged in the LCT header of the LCT packet transmitted in the FLUTE session.

The filtering information may be arranged in a Transport Object Identifier (TOI) of the LCT header.

The filtering information may be arranged in an extended area of the LCT header.

Apart or all of the filtering information may be arranged instead of a code point that is an area used according to an operation in the LCT header.

The filtering information may include at least one of compression information representing compression/no-compression of the first signaling data, type information representing a type of the first signaling data, extended filter information representing a filtering condition set for each type of the first signaling data, and version information representing a version of the first signaling data.

The first signaling data may be acquired from a server through a network.

The first signaling data may include index information of the FLUTE session.

The first signaling data may be Service Channel Signaling (SCS) or an Electronic Service Guide (ESG), the second signaling data may be Low Layer Signaling (LLS), and a common IP address may be assigned to components and SCS configuring a specific service transmitted using the FLUTE session.

The receiving device may be an independent device or an internal block configuring one device.

A reception method according to a first aspect of the present technology is a reception method corresponding to the receiving device according to the first aspect of the present technology.

In the receiving device and the reception method according to the first aspect of the present technology, a broadcasting wave of digital broadcasting using an IP transmission system is received, and a filtering process of first signaling data stored in a packet is performed by using filtering information arranged in a header of the packet transmitted in a first layer that is a layer upper than an IP layer in layers of a protocol of the IP transmission system in the broadcasting wave.

A transmitting device according to a second aspect of the present technology includes: a first acquisition unit that acquires one or a plurality of components configuring a service; a second acquisition unit that acquires first signaling data; and a transmission unit that transmits the first signaling data together with the components by using a broadcasting wave of digital broadcasting using an IP transmission system, wherein, in the broadcasting wave, in a header of a packet, in which the first signaling data is stored, transmitted a first layer that is a layer upper than an IP layer in layers of a protocol of the IP transmission system, filtering information used in a filtering process of the packet is arranged.

The packet may be an LCT packet transmitted using a FLUTE session, the filtering information, in the LCT packet, may be arranged in an LCT header, and the first signaling data may be arranged in an LCT pay load.

The filtering information may be arranged in a TOI of the LCT header.

The filtering information may be arranged in an extended area of the LCT header.

Apart or all of the filtering information may be arranged instead of a code point that is an area used according to an operation in the LCT header.

The filtering information may include at least one of compression information representing compression/no-compress on of the first signaling data, type information representing a type of the first signaling data, extended filter information representing a filtering condition set for each type of the first signaling data, and version information representing a version of the first signaling data.

The first signaling data may be acquired from a server through a network.

The first signaling data may include index information of the FLUTE session.

The first signaling data may be SCS or an ESG, second signaling data transmitted in a second layer that is a layer lower than the IP layer may be LLS, and a common IP address may be assigned to components and SCS configuring a specific service transmitted using the FLUTE session.

The transmitting device may be an independent device or an internal block configuring one device.

A transmission method according to a second aspect of the present technology is a transmission method corresponding to the transmitting device according to the second aspect of the present technology.

In the transmitting device and the transmission method according to the second aspect of the present technology, one or a plurality of components configuring a service are acquired, first signaling data is acquired, and the first signaling data is transmitted together with the components by using a broadcasting wave of digital broadcasting using an IP transmission system. In the broadcasting wave, in a header of a packet, in which the first signaling data is stored, transmitted in a first layer that is a layer upper than an IP layer in layers of a protocol of the IP transmission system, filtering information used in a filtering process of the packet is arranged.

Effects of the Invention

According to first and second aspects of the present technology, an effective filtering process can be performed.

An effect is not necessarily limited to the effect described here but may be any effect described in the present disclosure.

BRIEF DESCRIPTION OF DRAWINGS

FIG. 5 is a diagram that illustrates detailed contents of elements of the LCT header of Pattern 1.

FIG. 6 is a diagram that illustrates a bit length of filtering information.

FIG. 7 is a diagram that illustrates detailed contents of type information.

FIG. 10 is a diagram that illustrates detailed contents of elements of the LCT header of Pattern 2.

DETAILED DESCRIPTION OF THE INVENTION

Hereinafter, embodiments of the present technology will be described with reference to the accompanying drawings. The description will be presented in the foil owing order.

1. Overview of Digital Broadcasting Using IP Transmission System
2. Packet Structure
(1) LCT Header (Pattern 1)
(2) LCT Header (Pattern 2)
(3) LCT Header (Pattern 3)
3. Packet Filtering Process
4. Operation Example
5. Configuration of Broadcasting Communication System
6. Flow of Specific Process Performed. by Each Device
7. Configuration of Computer <1. Overview of Digital Broadcasting Using IP Transmission System>

(Configuration of Broadcasting Wave of IP Transmission System)

Figure 1:
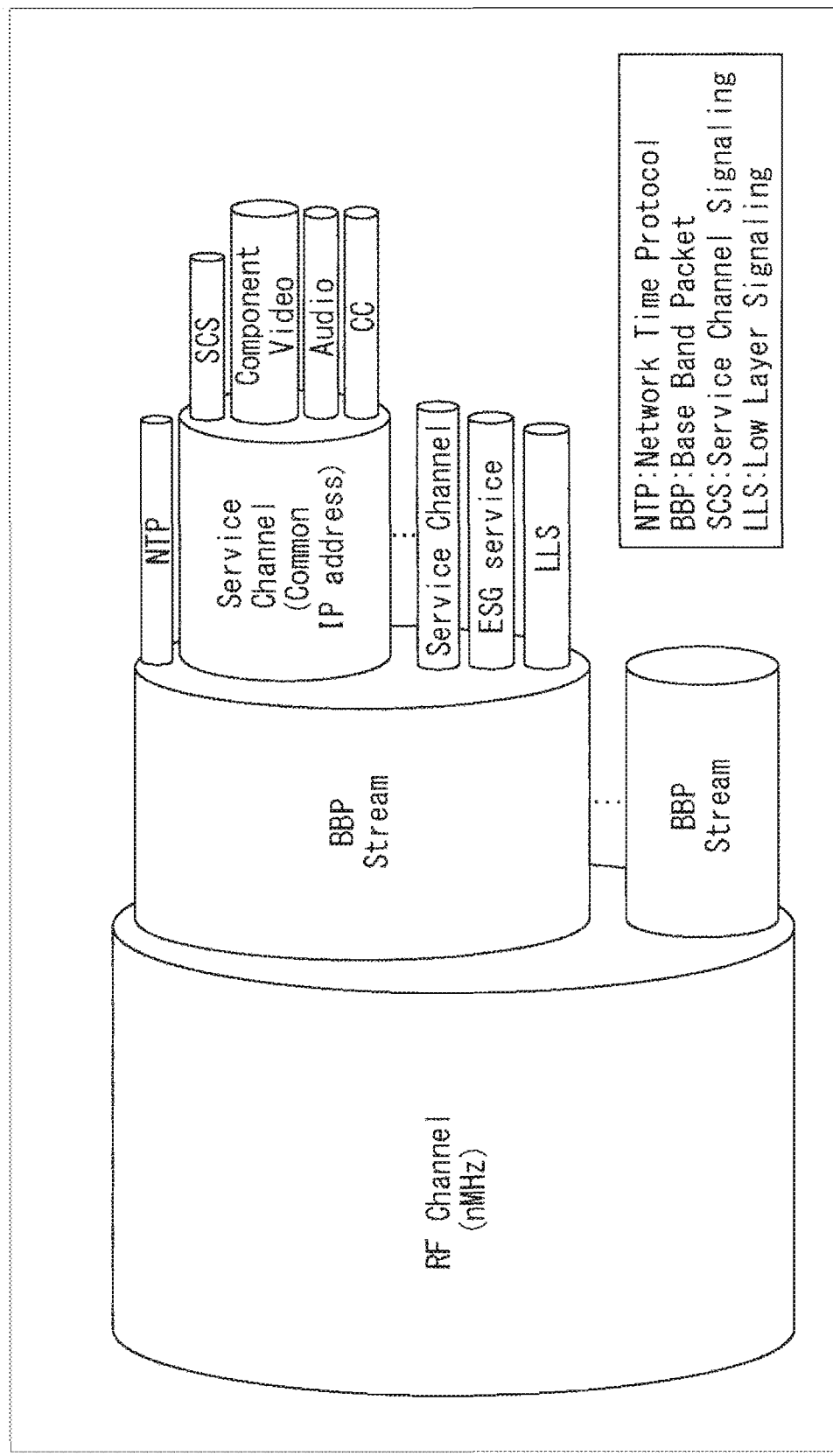
FIG. 1 is a diagram that illustrates the configuration of a broadcasting wave of digital broadcasting of an IP transmission system.

FIG. 1 is a diagram that illustrates the configuration of a broadcasting wave of digital broadcasting of an IP transmission system.

As illustrated in FIG. 1, in a broadcasting wave (RF Channel) having a predetermined frequency band, a plurality of BBP streams are transmitted. In each BBP stream, a Network Time Protocol (NTP), a plurality of service channels, an ESG (ESG Service), and Low Layer Signaling (LLS) are included.

Here, while the NTP, the service channels, and the electronic service guide are transmitted according to a UDP/IP protocol, the LLS is transmitted on the BBP stream. In addition, the NTP is time information and is common to the plurality of service channels. The Electronic Service Guide (ESG) is an electronic service guide including metadata relating to programs.

In each service channel, components of video data (Video), audio data (Audio), a subtitle, and the like (CC: Closed Captioning) and Service Channel Signaling (SCS) are included. The SCS is signaling data configured in units of services. In addition, a common IP address is assigned to each service channel, and for example, by using this IP address, the components, the SCS, and the like can be packaged for each one or a plurality of service channels.

In addition, in the digital broadcasting of the IP transmission system, a network ID (network_id) is assigned to a broadcasting network (Network), and a BBP stream ID (BBP_stream_id) is assigned to the BBP stream. In addition, a service ID (service_id) is assigned to one or a plurality of services included in each BBP stream. Here, the services correspond to the service channels illustrated in FIG. 1.

In this way, in the digital broadcasting of the IP transmission system, as an ID system, a configuration corresponding to a combination (hereinafter, referred to as a "triplet") of a network ID (network_id), a transport stream ID (transport_stream_id), and a service ID (service_id) used in the MPEG2-TS system is employed, and, by using this triplet, a BBP stream configuration and a service configuration within a broadcasting network appear.

In this way, since matching with the MPEG2-TS system that is currently widespread can be made, for example, simulcast at the time of transiting from the MPEG2-TS system to the IP transmission system can be easily responded. Here, in an ID system of the IP transmission system, instead of the transport stream ID, a BBP stream ID is used.

(Protocol Stack)

Figure 2:
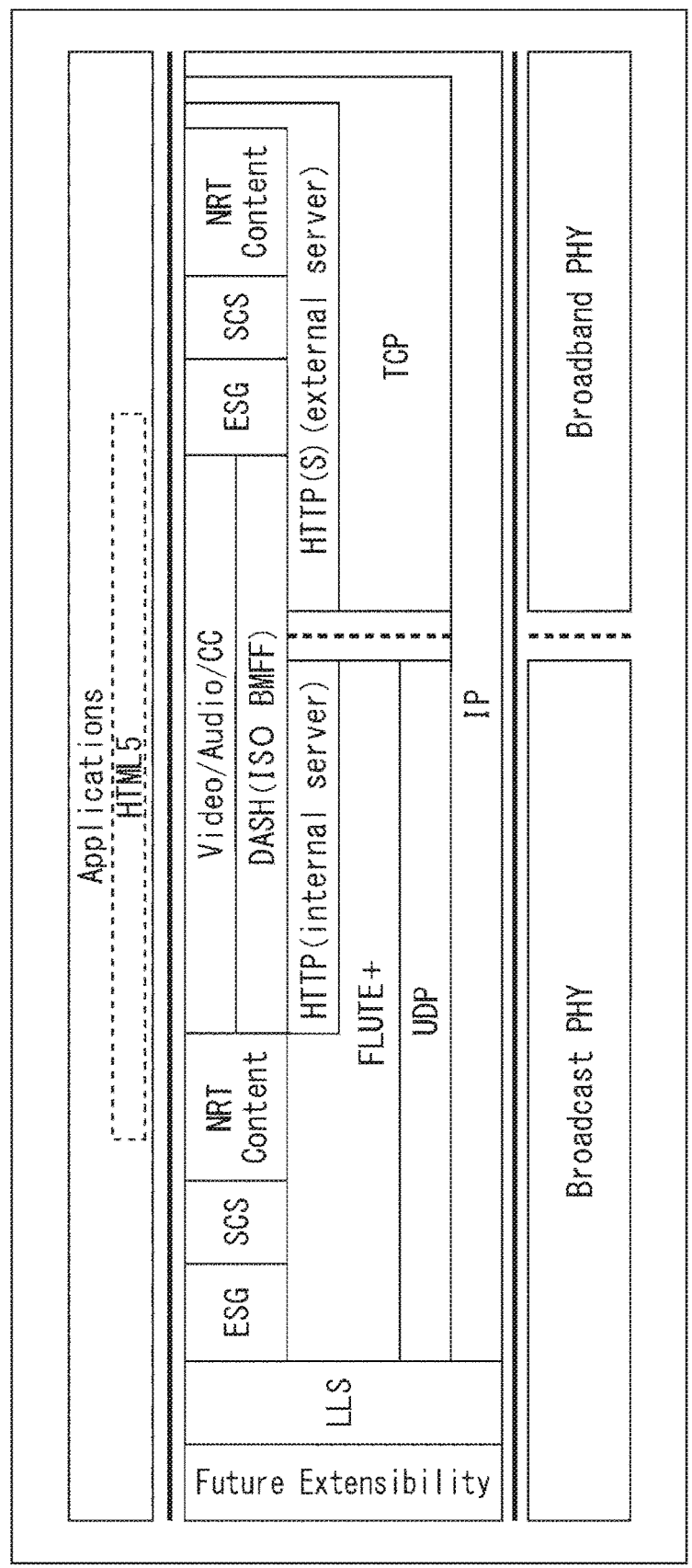
FIG. 2 is a diagram that illustrates a protocol stack of digital broadcasting of the IP transmission system.

FIG. 2 is a diagram that illustrates a protocol stack of digital broadcasting of the IP transmission system.

As s rated in FIG. 2, a lowest layer is a physical layer. In digital broadcasting of the IP transmission system, the transmission is not limited to transmission using broadcasting, but there are cases where a part of data is transmitted using communication. In cases where the broadcasting is used, a frequency band of a broadcasting wave assigned for a service (channel) corresponds to the physical layer (Broadcast PHY).

An upper layer of the physical layer is an IP layer. The IP layer corresponds to an Internet. Protocol (IP) in a protocol stack of TCP/IP, and an TP packet is specified by an IP address. An upper layer adjacent to the IP layer is a UDP layer, and a further upper layer is FLUTE+. In other words, in the digital broadcasting of the IP transmission system, a packet to which an IP address and a port number of a User Datagram Protocol (UDP) are assigned is transmitted, and a File Delivery over Unidirectional Transport (FLUTE) session is established.

The FLUTE+ is an extension of the FLUTE that has been conventionally defined, and details of the FLUTE are defined as RFC6726. In addition, there are cases where the FLUTE+ (plus) is called "FLUTE enhancement". In a FLUTE session, a file to be transmitted and the like are managed as one object by using a Transport Object Identifier (TOI). In addition, a set of a plurality of objects are managed as one session by using a Transport Session Identifier (TSI). In other words, in a FLUTE session, a specific file can be designated by using two types of identification information including the TSI and the TOI.

Among upper layers adjacent to the FLUTE, some layers are an Electronic Service Guide (ESG), Service Channel Signaling (SCS), and an NRT content (NRT Content), and the ESG, the SCS, and the NRT content are transmitted using a FLUTE session. The NRT content is a content transmitted through Non Real Time (NRT) broadcasting and is stored once in a storage of a receiver and, then, is reproduced. Here, the NRT content is an example of a content, and a file of another content may be transmitted using a FLUTE session.

As the SCS, for example, a User Service Bundle Description (USBD), an Media Presentation Description (MPD), an Session Description Protocol (SDP), and an Service Parameter Description (SPD) are transmitted.

The USBD includes information used for referring to the MPD and the SDP and the like. The MPD includes information of a segment Uniform Resource Locator (URL) of each component transmitted in units of services. The SDP includes location information of components and the like. The SPD is configured to include various kinds of parameters defined in levels of services and components. For example, the USBD, the MPD, the SDP, and the SPD are described using a markup language such as an Extensible Markup Language (XML).

Among upper layers adjacent to the FLUTE, a layer other than the layers described above is an HTTP (internal server), and an upper layer adjacent to the HTTP is DASH (ISO BMFF). In addition, an upper layer adjacent to the DASH (ISO BMFF) is a component of video data (Video), audio data (Audio), subtitle data (Closed Caption), or the like. In other words, the components of the video, the audio, the subtitle, and the like are transmitted using a FLUTE session in units of media segments compliant with the specification of an ISO Base Media File Format.

The Low Layer Signaling (LLS) is signaling data of a low layer and is transmitted on a BBP stream. For example, as the LLS, a Service Configuration Description (SCD), a Service Association Description (SAD), an Emergency Alerting Description (BAD), or a Region Rating Description (RRD) is transmitted.

The SCD employs an ID system corresponding to the triplet used in the MPEG2-TS system, and the BBP stream configuration and the service configuration within a broadcasting network appear according to this triplet. In the SCT, information of an IP address and the like as attribute/setting information configured in units of services, ESG bootstrap information used for accessing the ESG, and SC bootstrap information used for accessing the SCS are included.

The SAD represents an on-air service for each BBP stream. The EAD includes information relating to an urgent notification The RRD includes rating information. The SCD, the SAD, the EAD, and the RRD, for example, are described using a markup language such as an XML.

In addition, in a case where communication is used, an upper layer of the physical layer (Broadband PHY) is an IP layer. In addition, an upper layer adjacent to the IP layer is a TCP layer. Furthermore, an upper layer adjacent to the TCP layer is an HTTP(S) (external server) layer. In other words, according to such layers, a protocol stack operating in a network such as the Internet is implemented.

In this way, the receiver, for example, communicates with a server on the Internet by using a TCP/IP protocol and can receive the ESG, the SCS, the NRT content, and the like.

In addition, the receiver can receive components of a video, an audio, and the like that are adaptively distributed in a streaming manner from a server on the Internet This streaming distribution is compliant with the standards of the MPEG-DASH (Dynamic Adaptive Streaming over HTTP)

In addition, applications can be transmitted using a FLUTE session of broadcasting or the TCP/IP protocol of communication. These applications can be described using a markup language such as HyperText Markup Language 5 (HTML5).

In digital broadcasting of the IP transmission system, by employing the protocol stack as described above, for example, also in a case where signaling data of the ESG, the SCS, and the like is transmitted in any of broadcasting and communication, in a layer except for the physical layer (and the data link layer) that is a layer lower than the IP layer, in other words, in a layer higher than the IP layer, the protocol can be configured to be common, and accordingly, it is expected that the implementation burden or the processing load can be decreased in the receiver or the like.

<2. Packet Structure>

(Packet Structure)

Figure 3:
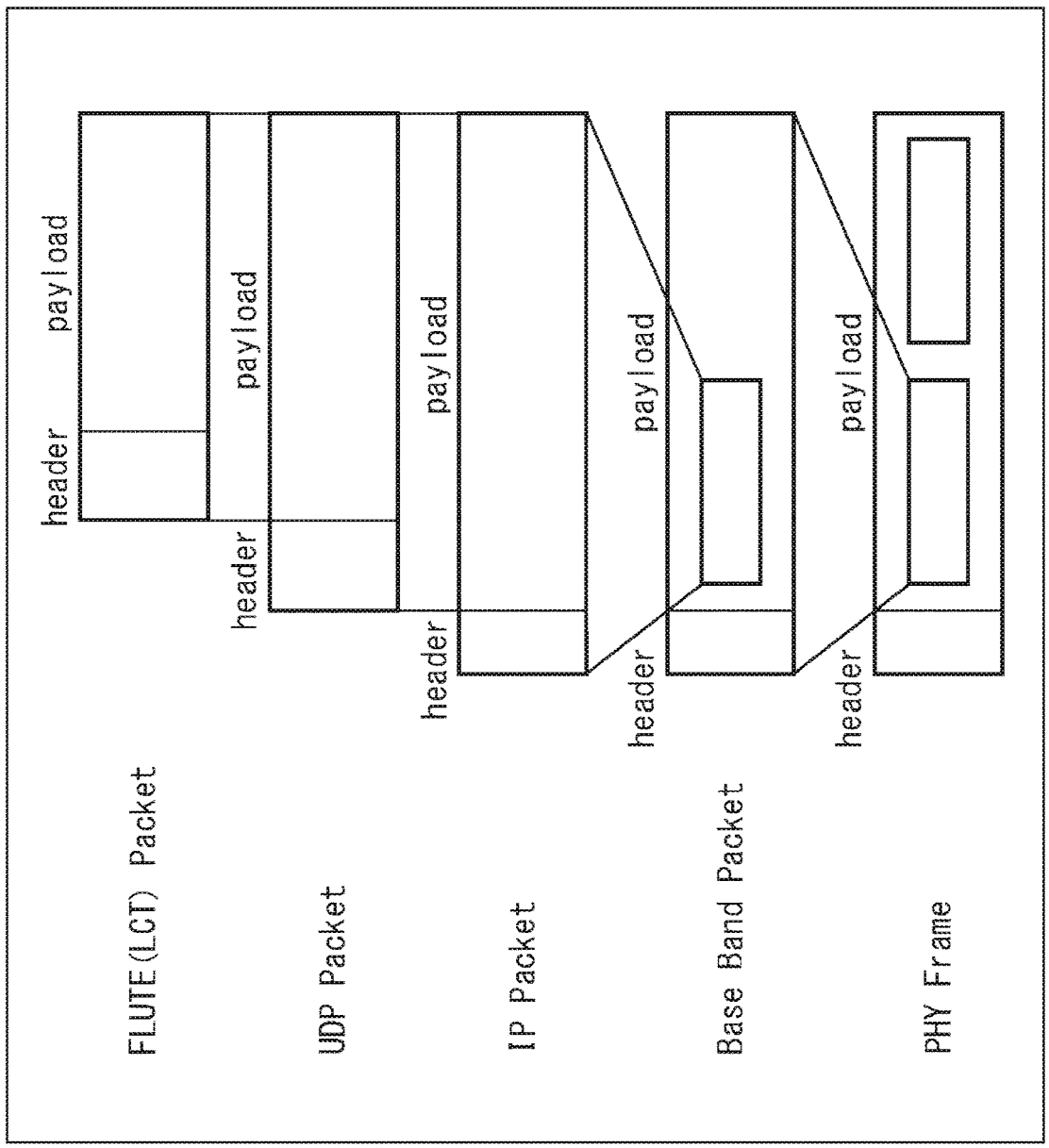
FIG. 3 is a diagram that illustrates the structures of packets transmitted in a broadcasting wave of digital broadcasting of the IP transmission system.

FIG. 3 is a diagram that illustrates the structures of packets transmitted in a broadcasting wave of digital broadcasting of the IP transmission system. The packet structure illustrated in FIG. 3 corresponds to the broadcasting-side layers of the protocol stack illustrated in FIG. 2.

In other words, a physical frame (PHY Frame) corresponds to the frame structure of the physical layer (Broadcast PHY) illustrated in FIG. 2. In addition, a BBP packet (Base Band Packet) corresponds to the structure of a packet transmitted in a BBP stream (Base Band Packet Stream) positioned between the physical layer (Broadcast PHY) and the IP layer illustrated in FIG. 2. An IP packet corresponds to the IP layer illustrated in FIG. 2, a UDP packet corresponds to a UDP layer illustrated in FIG. 2, and a FLUTE packet corresponds to the packet structure of the FLUTE layer illustrated in FIG. 2. In description presented below, a FLUTE packet will be referred to as a Layered Coding Transport (LCT) packet.

As illustrated in FIG. 3, a physical frame is configured by a physical header and a payload. In the payload of the physical frame, a plurality of BBP packets is included. Each BBP packet is configured by a BBP header and a payload. In the payload of the BBP packet, an IP packet is included. In other words, a case where an IP packet is transmitted using a BBP stream, the portion of the payload is the IP packet.

The IP packet is configured by an IP header and a payload. In addition, a UDP packet is configured by a UDP header and a payload. Furthermore, an LCT packet is configured by an LCT header and a payload. In other words, to a packet in which components of a video and an audio and data such as an ESG and SCS, which are transmitted using a FLUTE session, are stored, a BBP header, an IP header, a UDP header, and an LCT header are added.

Next, a detailed structure of the LCT header added to the LCT packet illustrated in FIG. 3 will be described with reference to FIGS. 4 to 11. Details of the LCT header are defined as RFC 5651.

(1) LCT Header (Pattern 1)

Figure 4:
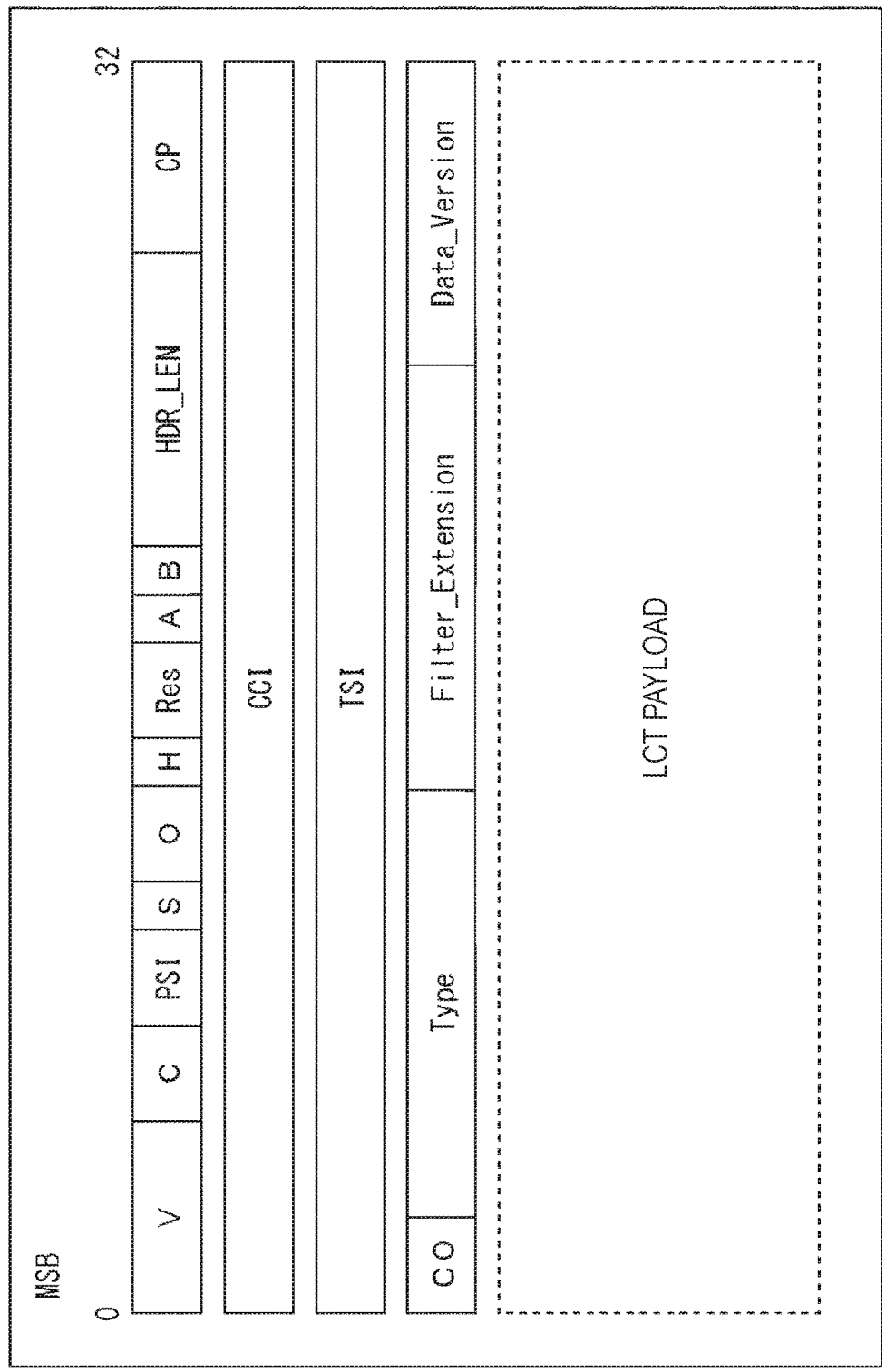
FIG. 4 is a diagram that illustrates the structure of an LCT header of Pattern 1.

FIG. 4 is a diagram that illustrates the structure of an LCT header of Pattern 1. In FIG. 5, each element configuring the LCT header illustrated in FIG. 4 is described, and description will be presented with appropriate reference thereto.

As illustrated in FIG. 4, an LCT packet is configured by an LCT header in which header information from "V" to "Data_Version" is arranged and an LCT payload in which actual data such as signaling data is arranged.

At the start of the LCT header, the version of the LCT packet represented as "V" in FIG. 4 is arranged. In FIG. 4, after "V", "C" is arranged. In "C", a flag representing the length of Congestion Control Information (CCI) is arranged.

In FIG. 4, after "C", "PSI" is arranged. In "PSI", bits that set Protocol Specific Information (PSI) are arranged.

In FIG. 4, after "PSI", "S" is arranged. In "S", a flag that represents the length of a Transport Session Identifier (TSI) is arranged. After "S", "O" is arranged, and, after that, "H" is arranged. In "O" and "H", flags representing the lengths of "CO", "Type", "Filter_Extension", and "Data_Version", which are arranged in the LCT header illustrated in FIG. 4, are arranged. As will be described in detail later, "CO", "Type", "Filter_Extension", and "Data_Version" are parameters used for a filtering process of signaling data and, hereinafter, will be referred to as "filtering information".

For example, as illustrated in FIG. 6, in a case where "O" is set to two bits, and "H" is set to one bit, the bit length of the filtering information is determined based on a combination of bits of "O" and "H". More specifically, in a case where "O" is "00", and "H" "1", a total bit length of the filtering information is 16 bits. Out of the 16 bits, two bits are assigned to "CO", eight bits are assigned to "Type", and six bits are assigned to "Data_Version". In this case, "Filter_Extension" cannot be designated.

On the other hand, in a case where "O" is "01", and "H" is "0", out of a total bit length of 32 bits of the filtering information, two bits are assigned to "CO", eight bits are assigned to "Type", six bits are assigned to "Filter_Extension", and 16 bits are assigned to "Data_Version". In addition, in a case where "O" is "01", and "H" is "1", out of a total bit length of 48 bits of the filtering information, two bits are assigned to "CO", eight bits are assigned to "Type", 22 bits are assigned to "Filter_Extension", and 16 bits are assigned to "Data_Version".

Furthermore, in a case where "O" is "10", and "H" is "0", out of a total bit length of 64 bits of the filtering information, two bits are assigned to "CO", eight bits are assigned to "Type", 38 bits are assigned to "Filter_Extension", and 16 bits assigned to "Data_Version". In addition, in a case where "O" is "10", and "H" is "1", out of a total bit length of 80 bits of the filtering information, two bits are assigned to "CO", 16 bits are assigned to "Type", 46 bits are assigned to "Filter_Extension", and 16 bits are assigned to "Data_Version".

Furthermore, in a case where "O" is "11", and "H" is "0", out of a total bit length of 96 bits of the filtering information, two bits are assigned to "CO", 16 bits are assigned to "Type", 62 bits are assigned to "Filter_Extension", and 16 bits are assigned to "Data_Version". In addition, in a case where "O" is "11", and "H" is "1", out of a total bit length of 112 bits of the filtering information, two bits are assigned to "CO", 16 bits are assigned to "Type", 78 bits are assigned to "Filter_Extension", and 16 bits are assigned to "Data_Version".

Referring back to FIG. 4, "Res" arranged after "H" represents an area used for a further extension. After "Res", "A" is arranged. In "A", a flag representing the end of a session is arranged. After "A", "B" is arranged. In "B", a flag representing the end of an object is arranged. After "B", "HDR_LEN" is arranged. In "HDR_LEN", a header length is arranged. After "HDR_LEN", "CP" is arranged. "CP" is an abbreviation of a code point, and the value of the code point is arranged therein. A method of using this code point is different according to the operation.

After "CP", "CCI" is arranged. In "CCI", Congestion Control Information (CCI) is arranged. After "CCI", "TSI" is arranged. In "TSI", a Transport Session Identifier (TSI) is arranged. After "TSI", while, normally, "TOI" is arranged, in the LCT header of Pattern 1, as the filtering information, "CO", "Type", "Filter_Extension", and, "Data_Version" are arranged.

"CO" is an abbreviation of compress and is compression information representing compression/no-compression of current signaling data. In a case where the current signaling data is compressed, for example, a compression format such as ZIP is also represented.

"Type" is type information representing the type signaling data. For example, as illustrated in FIG. 7, in the case of all the signaling data, "1" is designated as "Type" Similarly, a value corresponding to the type of signaling data is designated as "Type". Thus, "2" is designated for the ESG, "3" is designated for the USBD, "4" is designated for the FDD, "5" is designated for the MPD, "6" is designated for the SDP, and "7" is designated for the SPD.

Referring back to FIG. 5, "Filter_Extension" is extended filter information that represents a filtering condition set for each type of signaling data. This filtering condition can be arbitrarily set. "Data_Version" is version information that represents the version of the current signaling data.

As the filtering information, all the compression information (CO), the type information (Type), the extended filter information (Filter_Extension), and the version information (Data_Version) do not need to be arranged, but, among such information, at least one type of information may be arranged in correspondence with the filtering condition. In addition, the compression information (CO), the type information (Type), the extended filter information (Filter_Extension), and the version information (Data_Version) are examples of the filtering information, and other parameters may be defined as long as the parameters can be used for the filtering process of signaling data.

As above, the LCT header of Pattern 1, conventionally, in the TCI used as identification information of an object transmitted using a FLUTE session, the filtering information formed by the compression information (CO), the type information (Type), the extended filter information (Filter_Extension), and the version information (Data_Version) is defined. Accordingly, the receiver can acquire current signaling data by performing the filtering process of the LCT packet by using the filtering information of the LCT header.

(2) LCT Header (Pattern 2)

Figure 8:
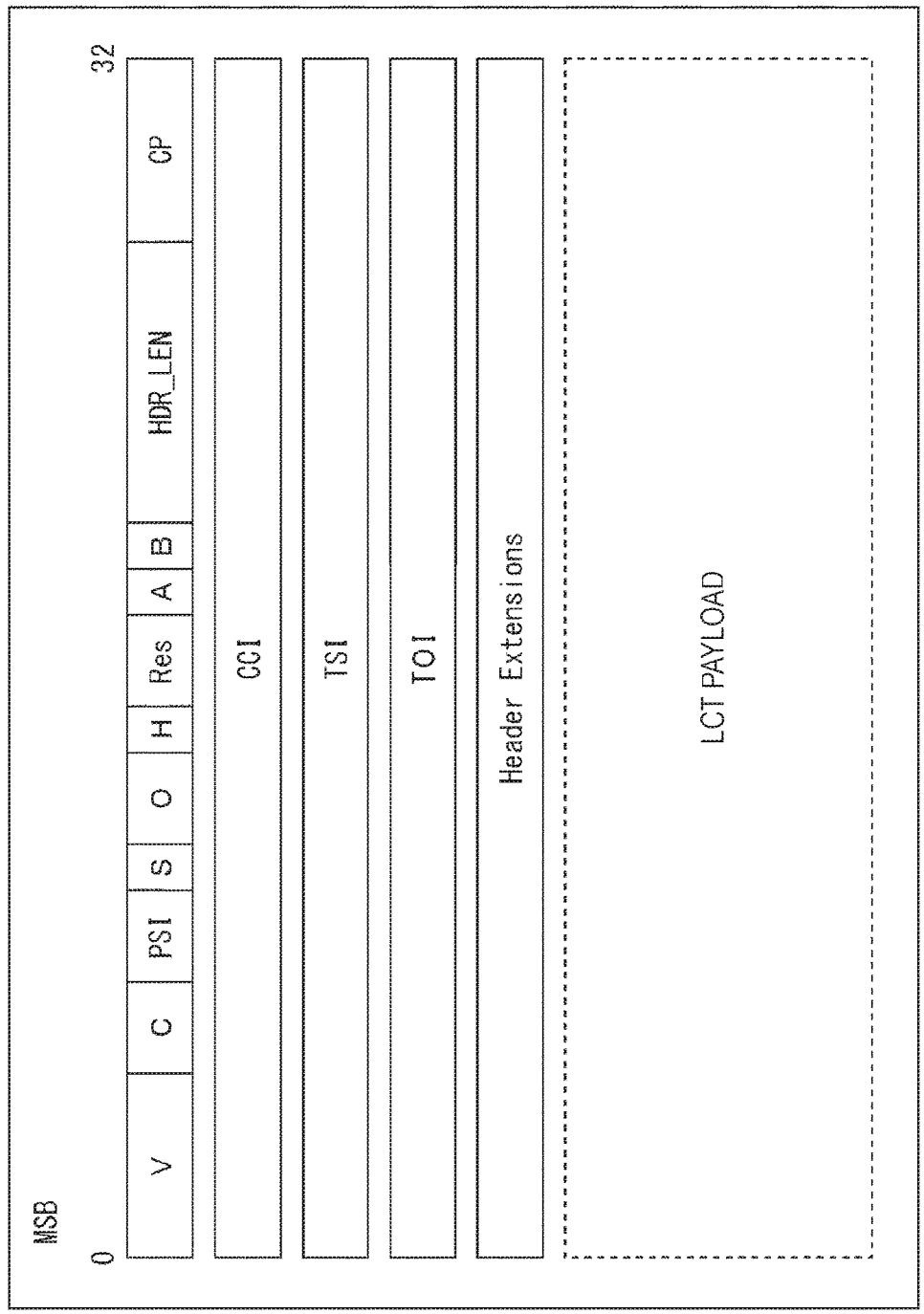
FIG. 8 is a diagram that illustrates the structure of an LCT header of Pattern 2.
Figure 9:
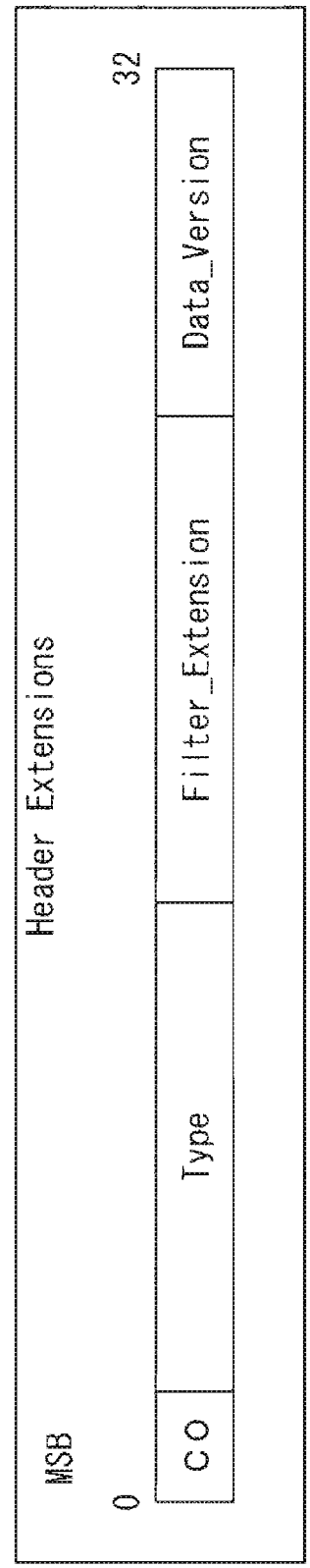
FIG. 9 is a diagram that illustrates the structure of header extensions of the LCT header of Pattern 2.

FIGS. 8 and 9 are diagrams that illustrate the structure of an LCT header of Pattern 2. In FIG. 10, each element configuring the LCT header illustrated in FIGS. 8 and 9 is described, and description will be presented with appropriate reference thereto.

As illustrated in FIG. 8, the LCT header of Pattern 2 is different from the LCT header (FIG. 4) of Pattern 1 in that "TOI" is arranged after "TSI", and, "Header Extensions" is arranged after "TOI". In addition, as illustrated in FIG. 9, in "Header Extensions", "CO", "Type", "Filter_Extension", and, "Data_Version" are arranged. In other words, the "Header Extensions" is an extended area (LCT extended header) of the LCT header, and, in this LCT extended header, filtering information used for the filtering process of signaling data is arranged.

By employing such a structure of the LCT header, "TOI" is arranged in addition to "TSI", and "TOI" follows a conventional FLUTE protocol. Accordingly, in the receiver, while a process for parsing the LCT extended header in addition to a general LCT header is necessary, there is an advantage that backward compatibility for a conventional FLUTE protocol can be maintained. In addition, an area of "Header Extensions" of the LCT header can be specified using "HDR_LEN".

As above, in the LCT header of Pattern 2, the TOI used as the identification information of an object transmitted in a FLUTE session is used as it is, and, in an extended area thereof, the filtering information formed by the compression information (CO), the type information (Type), the extended filter information (Filter_Extension), and the version information (Data_Version) is defined. Accordingly, the receiver can acquire current signaling data by performing the filtering process of the LCT packet by using the filtering information of the LCT header.

(3) LCT Header (Pattern 3)

Figure 11:
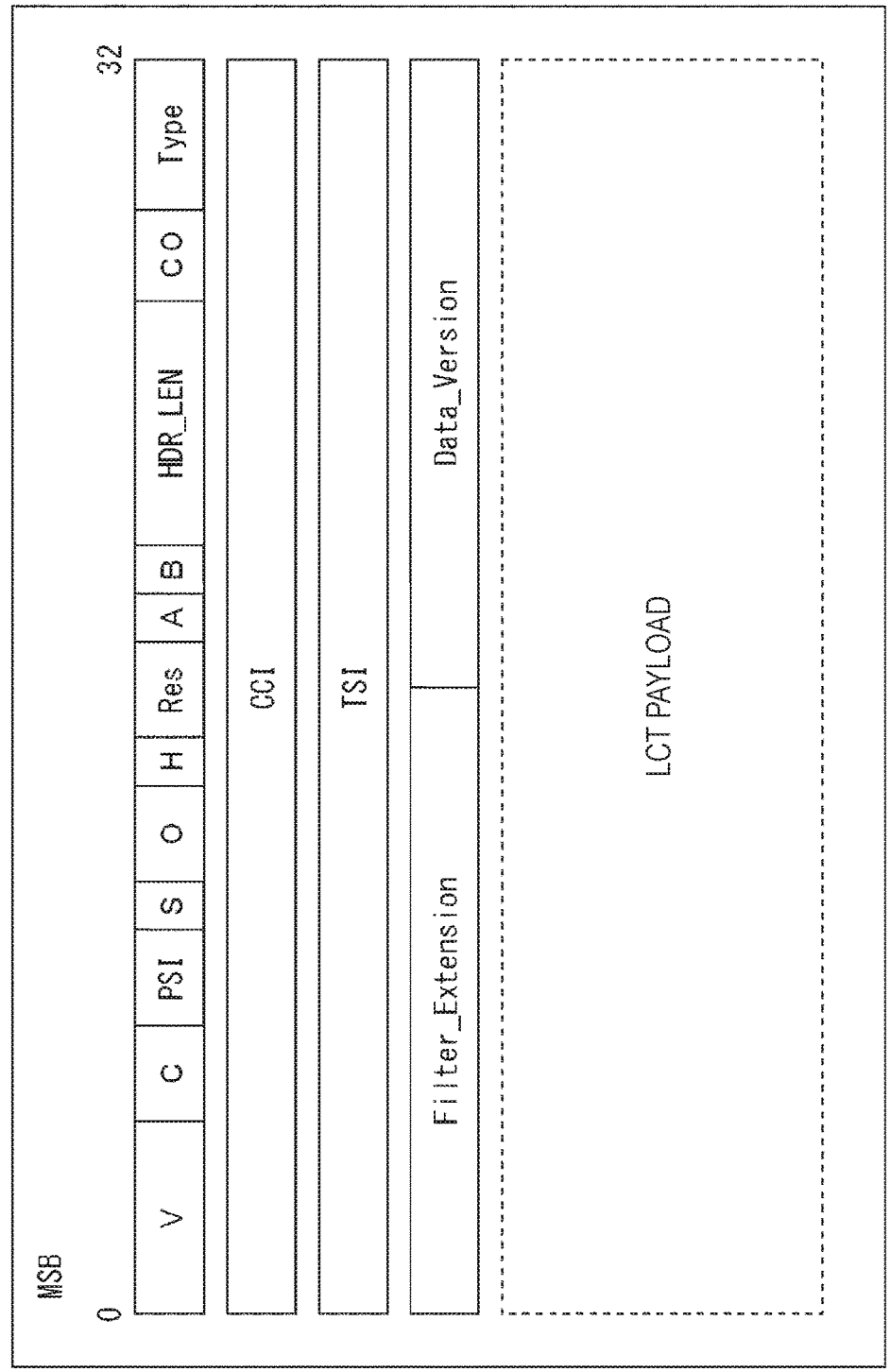
FIG. 11 is a diagram that illustrates the structure of an LCT header of Pattern 3.

FIG. 11 is a diagram that illustrates the structure of an LCT header of Pattern 3.

As illustrated in FIG. 11, the LCT header of Pattern 3 is different from the LCT header (FIG. 4) of Pattern 1 in that "CO" and "Type" are arranged instead of "CP". In such a case, when "CP" representing the value of a code point has 8 bits, two bits are assigned to "CO" that represents compression/no-compression of the current signaling data, and six bits are assigned to "Type" that represents the type of signaling data.

In addition, after "TSI" among "CO", "Type", "Filter_Extension", and "Data_Version", only "Filter_Extension" and "Data_Version" are arranged, which is an additional difference. In such a case, 16 bits are assigned to "Filter_Extension" that represents a filtering condition set for each type of signaling data, and 16 bits are assigned to "Data_Version" that represents the version of the current signaling data.

As above, in the LCT header of Pattern 3, the compression information (CO) and the type information (Type) are arranged in the CP (Code Point), and the extended filter information (Filter_Extension) and the version information (Data_Version) are further arranged in the TOI, whereby the filtering information is defined in the LCT header. Accordingly, the receiver can acquire current signaling data by performing the filtering process of the LCT packet by using the filtering information of the LCT header.

The above-described Pattern 1 to Pattern 3 are examples of the filtering information arranged in the LCT header, and a different arrangement may be employed as long as the filtering information can be arranged in the LCT header. For example, in the LCT header of Pattern 3, while an example has been described in which a part of the filtering information is arranged instead of the code point, all the filtering information may be arranged instead of the code point.

<3. Packet Filtering Process>

Figure 12:
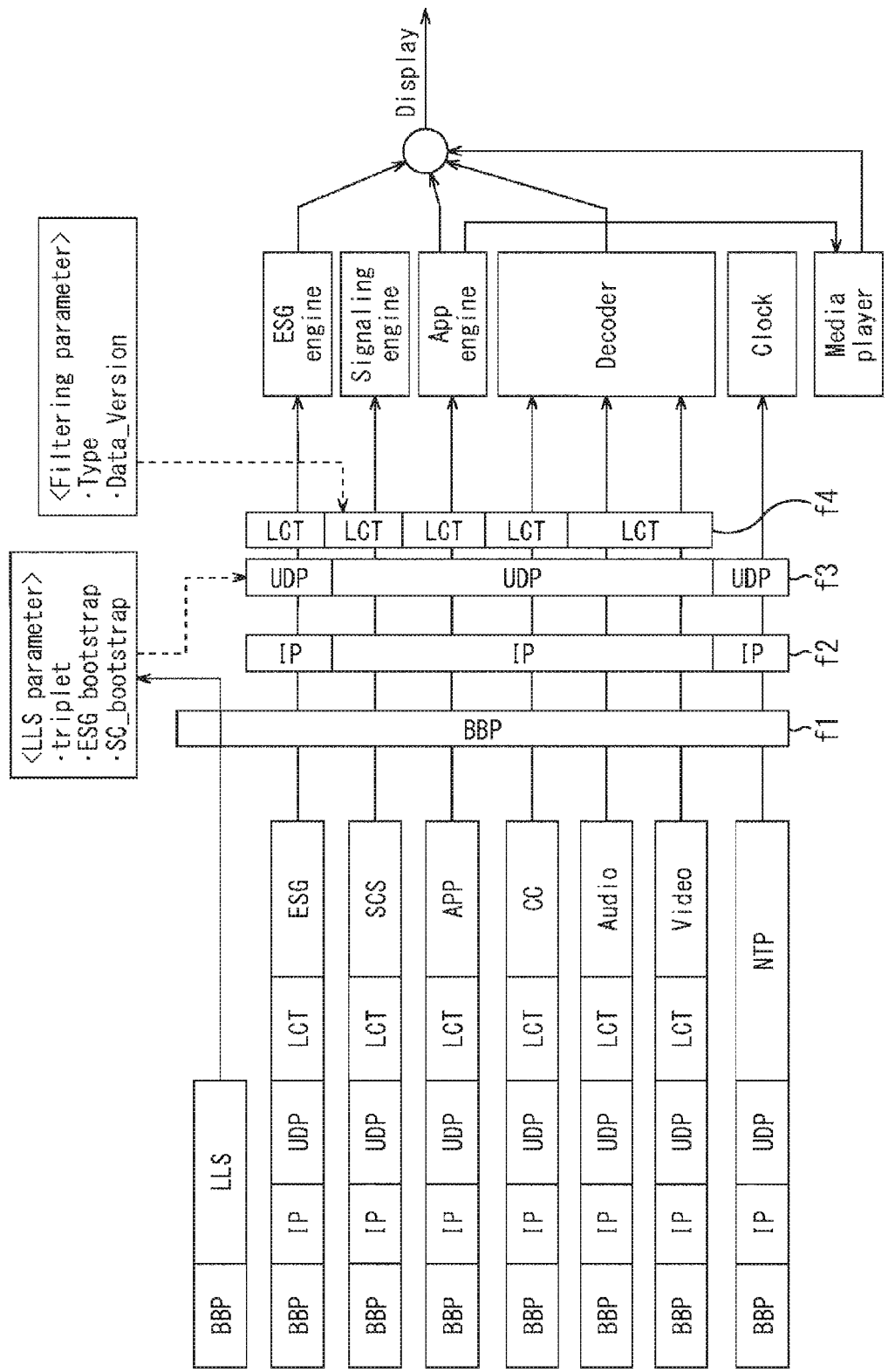
FIG. 12 is a diagram that illustrates a packet filtering process.

FIG. 12 is a diagram that illustrates a packet filtering process.

As illustrated in FIG. 12, to a filtering processing unit that performs a filtering process, each packet, in which LLS, ESG, SCS, an application (APP), components of video data (Video), audio data (Audio), subtitle data (CC), and the like, and data such as an NTP are stored, is input. Various headers are added to the packet.

The filtering processing unit illustrated in FIG. 12 includes: a BBP filter f1; an IP filter f2; a UDP filter f3; and an LCT filter f4. The BBP filter f1 performs a filtering process based on the BBP header. The IP filter f2 performs a filtering process based on the IP header. In addition, the UDP filter f3 performs a filtering process based on the UDP header. The LCT filter f4 performs a filtering process based on the LCT header.

In the example illustrated in FIG. 12, a packet other than a packet of LLS is an IP packet and satisfies a filtering condition of the IP filter f2 and thus passes through the BBP filter f1 and the IP filter f2. On the other hand, a packet of LLS does not satisfy the filtering condition of the IP filter f2 and thus does not pass through the IP filter f2, and the LLS stored in the packet is acquired. In the LLS, a triplet, ESG bootstrap information, and SC bootstrap information are included, and, for example, an IP address of a specific service, a port number, and a TSI can be acquired, and accordingly, a filtering process is performed using these as filtering conditions.

In addition, in the IP header of each packet, an IP address is included, and a port number is included in the UDP header. Accordingly, only a packet satisfying the filtering conditions passes through the IP filter f2 and the UDP filter f3. In addition, an LCT header is added to a packet transmitted using a FLUTE session. Here, in the LCT header, an TSI, a TOI, and the like are included, and accordingly, only a packet satisfying the filtering conditions passes through the LCT filter f4.

In addition, in the LCT header, since the compression information (CO), the type information (Type), the extended. filter information (Filter_Extension), and the version information (Data_Version) are arranged as the filtering information, only an LCT packet of which the filtering information satisfies the filtering conditions can pass through the LCT filter f4. Accordingly, for example, only in a case where the version information (Data_Version) of the SCS changes, a packet of the SCS can pass through.

By performing the filtering process as above, a packet of the ESG is output to an ESG engine, a packet of the SCS is output to a signaling engine, and a packet of the application (App) is output to an application engine (App engine). In addition, a packet of the subtitle data (CC) is output to a subtitle decoder (Decoder), a packet of the audio data (Audio) is output to an audio decoder (Decoder), a packet of the video data (Video) is output to a video decoder (Decoder), and a packet of the NTP is output to a clock generator (Clock).

Then, the ESG, the application, a video corresponding to the data of the video and the subtitle for which various processes have been performed by blocks of a later stage are displayed on a display. In addition, an audio corresponding to the audio data is output from a speaker (not illustrated in the drawing). In addition, there are cases where the application is displayed on the display by a media player.

<4. Operation Example>

Next, a specific operation example will be described with reference to FIGS. 13 to 16.

(1) Operation Example

Figure 13:
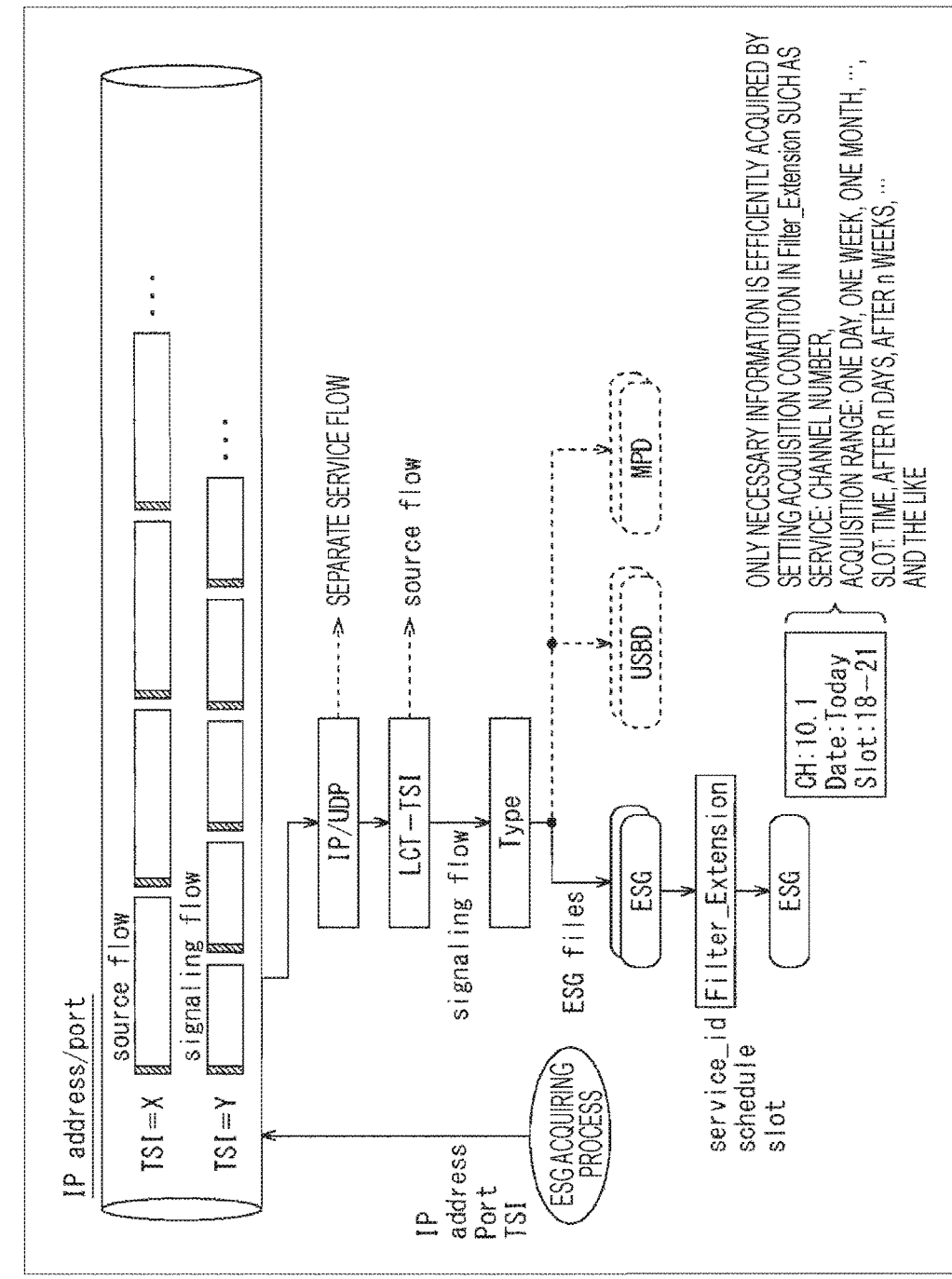
FIG. 13 is a diagram that illustrates a filtering process for acquiring a specific ESG.

FIG. 13 is a diagram that illustrates a filtering process for acquiring the file of a specific ESG.

In the case illustrated in FIG. 13, a transmitter of a broadcasting station (broadcasting organization) transmits components configuring each service, the SCS, the ESG, the LLS, and the like by using a broadcasting wave of digital broadcasting using the IP transmission system.

In the digital broadcasting, the ID system described above is employed. In addition, the components and the files of the SCS and the ESG are transmitted in a FLUTE session, and, in the LCT header of the LCT packet, the compression information (CO), the type information (Type), the extended filter information (Filter_Extension) and the version information (Data_Version) are arranged as the filtering information. In the example of the broadcasting wave illustrated in FIG. 13, a FLUTE session (hereinafter, referred to as a "source flow") of which TSI=X and a FLUTE session (hereinafter, referred to as "signaling flow") of which TSI=Y are transmitted as FLUTE sessions.

As illustrated in FIG. 13, when an ESG acquiring process is started, a receiver installed to each house or the like performs a filtering process using the IP header and the UDP header based on the ESG bootstrap information of the LLS (SCD) acquired at the time of initial scanning or the like and extracts a packet of the current service satisfying the filtering conditions of the IP address and the port number. Here, packets not satisfying the filtering conditions of the IP address and the port number are in a flow of a separate service.

In addition, the receiver performs a filtering process using the LCT header based on the ESG bootstrap information of the LLS (SCD) and extracts an LCT packet satisfying the filtering conditions of the TSI. Here, since an LCT packet of the signaling flow is extracted, a packet of which TSI=Y as the value of the TSI of the LCT header is extracted. In addition, in the filtering process, a packet of the source flow has TSI=X and does not satisfy the filtering conditions of the TSI and accordingly, is not extracted.

Here, in the LCT header of the LCT packet of which TSI=Y, the type information (Type) is arranged, and the type of signaling data can be recognized based on the type information. As the signaling data, while the ESG, the USBD, the MPD, and the like are transmitted, in this operation example 1, the file of the ESG s acquired. Accordingly, by filtering LCT packets using Type="2" as the filtering condition, only the LCT packet of the ESG is extracted.

While the ESG is an electronic service guide that provides information relating to programs for each service (channel), in a case where a plurality of services are provided, and the period is not limited, the amount of data is huge. Thus, by designating the extended filter information (Filter_Extension) as the filtering condition, only necessary information can be efficiently acquired.

For example, by setting a service ID, a schedule, a slot, and the like as filtering conditions, only files of a specific ESG can be extracted from among files of a plurality of ESGs. More specifically, service identification information (for example, 10.1 CH) such as a channel number, an acquisition range (for example, Today) according to a period such as one day, one week, or one month, a slot (for example 18 to 21) of a time, after n days, or after n weeks, or the like is set as filtering condition.

As above, in the operation example 1, after the IP address, the port number, and the TSI are resolved using the ESG bootstrap information of the LLS (SCD), only files of a specific ESG satisfying the filtering condition can be acquired from among signaling data by using the type information (Type) and the extended filter information (Filter_Extension) arranged in the LCT header. Accordingly, the receiver can efficiently acquire only necessary information at optimal timing.

(2) Operation Example 2

Figure 14:
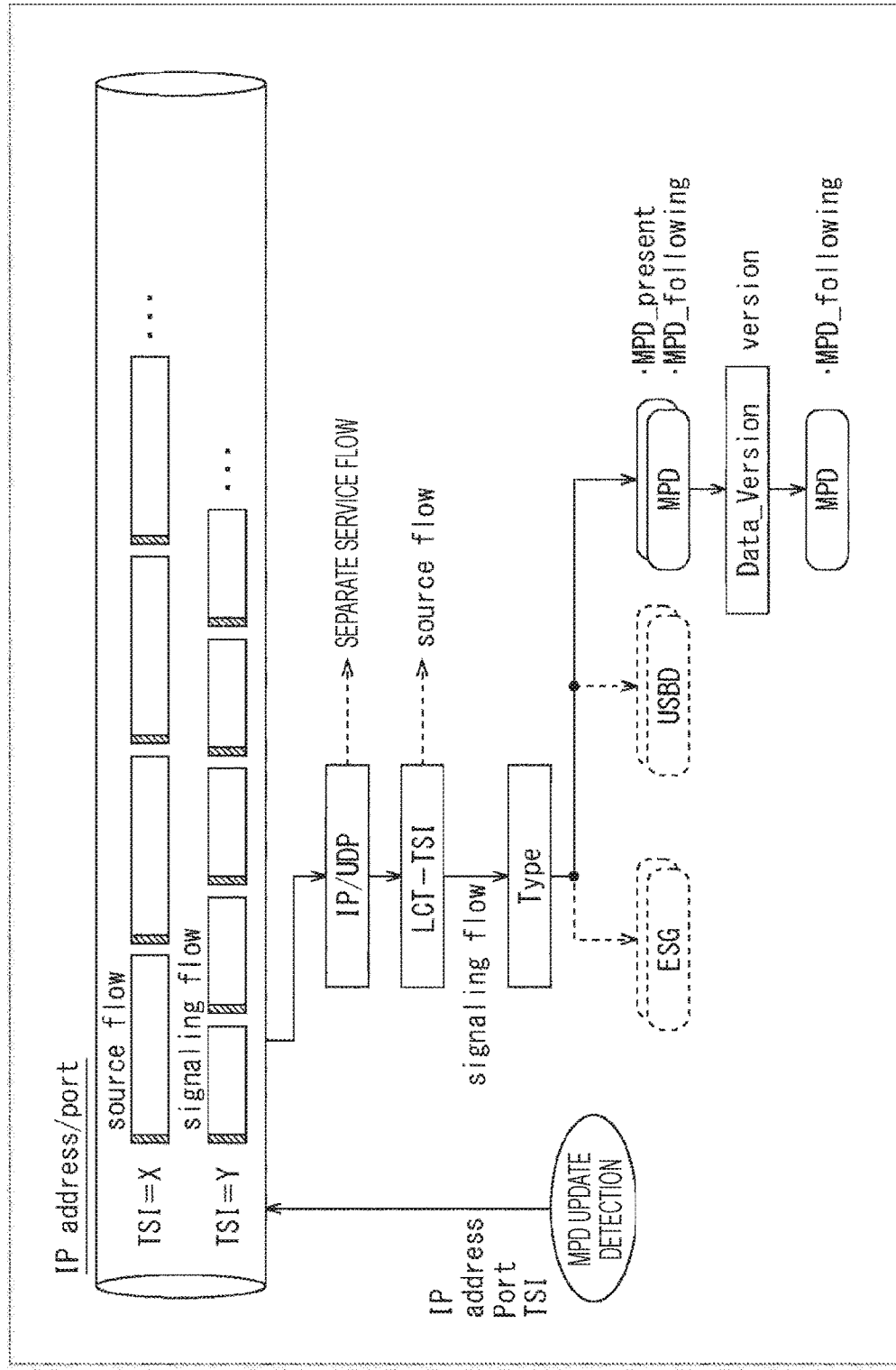
FIG. 14 is a diagram that illustrates a filtering process for acquiring an MPD after an update.

FIG. 14 is a diagram that illustrates a filtering process for acquiring an MPD after an update.

In the case illustrated in FIG. 14, a transmitter of a broadcasting station transmits components configuring each service, the SCS, and the like by using a broadcasting wave of digital broadcasting using the IP transmission system. In the digital broadcasting, the ID system described above is employed. In the example illustrated in FIG. 14, as a FLUTE session transmitting components and the SCS, a source flow (TSI=X) and a signaling flow (TSI=Y) are transmitted. In addition, in the LCT header of an LCT packet, filtering information is arranged.

As illustrated in FIG. 14, when an update of the MPD is detected, a receiver installed to each house or the like performs a filtering process using the IP header and the UDP header based on the SC bootstrap information of the LLS (SCD) acquired at the time of initial scanning or the like and extracts a packet of the current service satisfying the filtering conditions of the IP address and the port number. Here, packets not satisfying the filtering conditions of the IP address and the port number are in a flow of a separate service.

In addition, the receiver performs a filtering process using the LCT header based on the SC bootstrap information of the LLS (SCD) and extracts an LCT packet satisfying the filtering conditions of the TSI. Here, since an LCT packet of the signaling flow is extracted, an LCT packet of which TSI=Y as the value of the TSI of the LCT header is extracted. In addition, in the filtering process, a packet of the source flow has TSI=X and does not satisfy the filtering conditions of the TSI and accordingly, is not extracted.

Here, in the LCT header of the LCT packet of which TSI=Y, the type information (Type) is arranged, and the type of signaling data can be recognized based on the type information. As the signaling data, while the ESG, the USBD, the MPD, and the like are transmitted, in this operation example 2, the file of the MPD is acquired. Accordingly, by filtering LCT packets using Type="5" as the filtering condition, only a packet of the MPD is extracted.

There are two types of MPD including "present" and "following". MPD_present represents a current MPD, and MPD_following represents an MPD used for an update. Thus, by comparing the versions of MPDs with the version information (Data_Version) designated as filtering condition, an MPD used for an update can be acquired. In the case of the example illustrated in FIG. 14, through a filtering process using the filtering condition, the versions of the MPDs are compared, and MPD following is acquired.

As above, in the operation example 2, after the IP address, the port number, and the TSI are resolved using the ESG bootstrap information of the LLS (SCD), only an MPD used for an update can be acquired from among signaling data by using the type information (Type) and the version information (Data_Version) arranged in the LCT header. Accordingly, the receiver can efficiently acquire only necessary information at optimal timing at the time of detecting an update of the version.

In other words, after the IP address, the port number, and the TSI of a specific service are resolved using the LLS (SCD), the receiver acquires signaling data packetized as an LCT packet by the FLUTE session. In other words, by adding filtering information (parameter) that is a filtering condition of an LCT packet in which signaling data is stored to the LCT header that is the same layer, a filtering process can be efficiently performed at optimal timing.

(3) Operation Example 3

Figure 15:
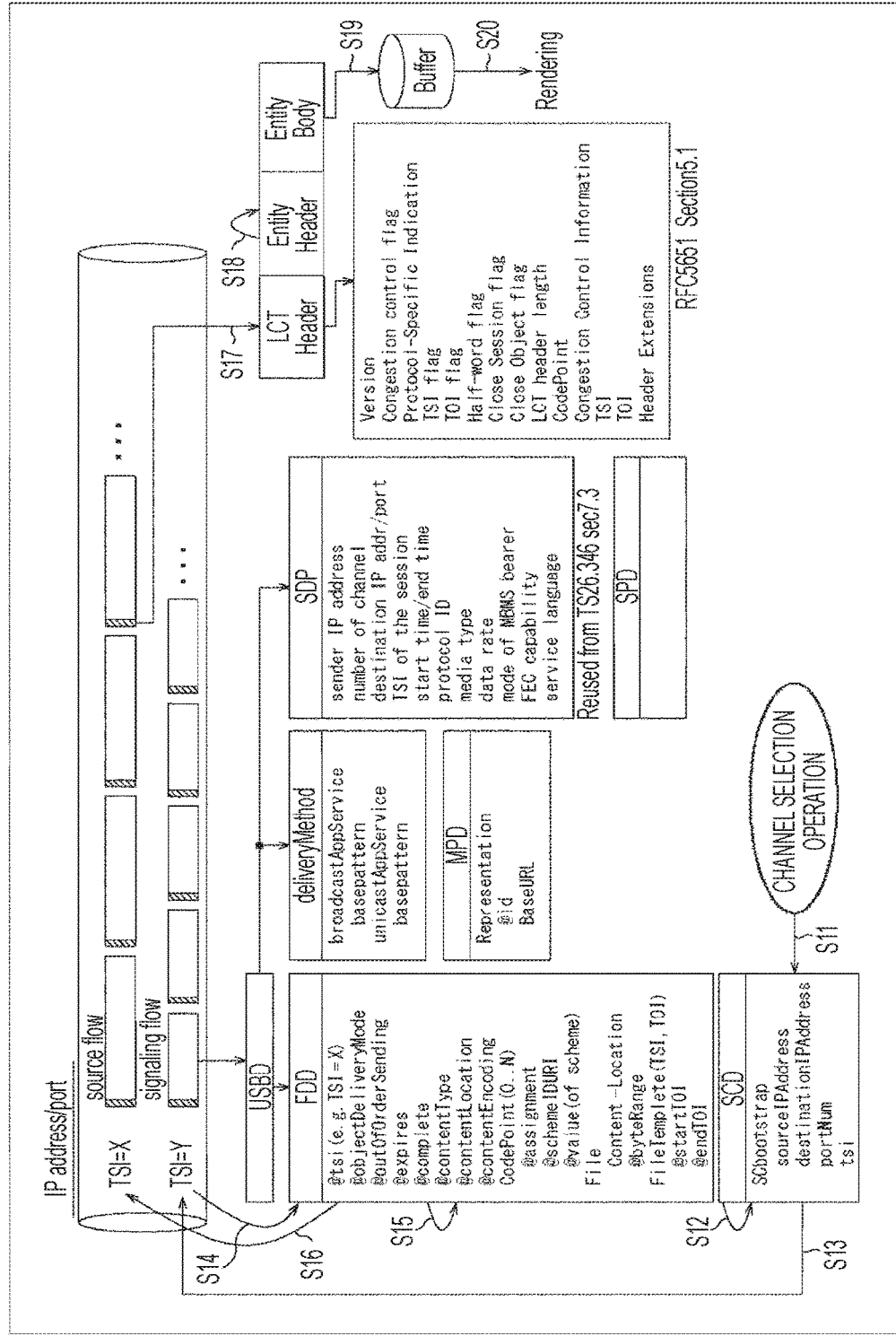
FIG. 15 is a diagram that illustrates a channel selection process performed in a case where data is transmitted only using broadcasting.

FIG. 15 is a diagram that illustrates a channel selection process performed in a case where data is transmitted only using broadcasting.

In the case illustrated in FIG. 15, a transmitter of a broadcasting station transmits components configuring each service, the SCS, and the like by using a broadcasting wave of digital broadcasting using the IP transmission system. In the digital broadcasting, the ID system described above is employed. In the example illustrated in FIG. 15, as a FLUTE session transmitting components and the SCS, a source flow (TSI=X) and a signaling flow (TSI=Y) are transmitted. In addition, in the LCT header of an LCT packet, filtering information can be arranged.

As illustrated in FIG. 15, when a channel selection operation of a specific service is performed by a user (S11), a receiver installed to each house or the like acquires SC bootstrap information of the SCD acquired at the time of initial scanning or the like (S12). The receiver extracts an LCT packet satisfying the filtering conditions of the IP address, the port number, and the TSI based on the SC bootstrap information. Here, since the LCT packet of the signaling flow is extracted, the LCT packet having TSI=Y as the value of the TSI of the LCT header is extracted (S13).

Here, in the signaling flow, as signaling data, a User Service Bundle Description (USBD), a Media Presentation Description (MPD), a Session Description Protocol (SDP), a Service Parameter Description (SPD), and the like are transmitted. In the USBD, a File Delivery Description (FDD) delivery Method, and the like are described, and accordingly, the receiver can acquire the FDD by extracting an LCT packet of the USBD (S14) in the FDD, as index information for each TSI, location information (for example, a URL or the like), a TOI, and the like are described.

The receiver can acquire an LCT packet in which data of components configuring a specific service is stored by accessing the source flow (TSI=X) (S15 and S16) based on the index information of the FDD (S17). In addition, in the LCT packet, in addition to the LCT header, an entity header is added, and, for example, information that dynamically changes or the like can be arranged (S18). Then, by storing data of a component restored from the LCT packet in a buffer (S19) and performing a rendering process, the receiver outputs a video and an audio corresponding to the components (S20).

As above, in the operation example 3, in a case where only data transmitted through broadcasting at the time of selecting a channel is used, components configuring a specific service selected as a channel can be acquired by using only the SCD and the FDD. In such a case, since the MPD, the SDP, and the SPD do not need to be used, and the FDD can be acquired as signaling data, the receiver can perform a speedy channel selection process.

(4) Operation Example 4

Figure 16:
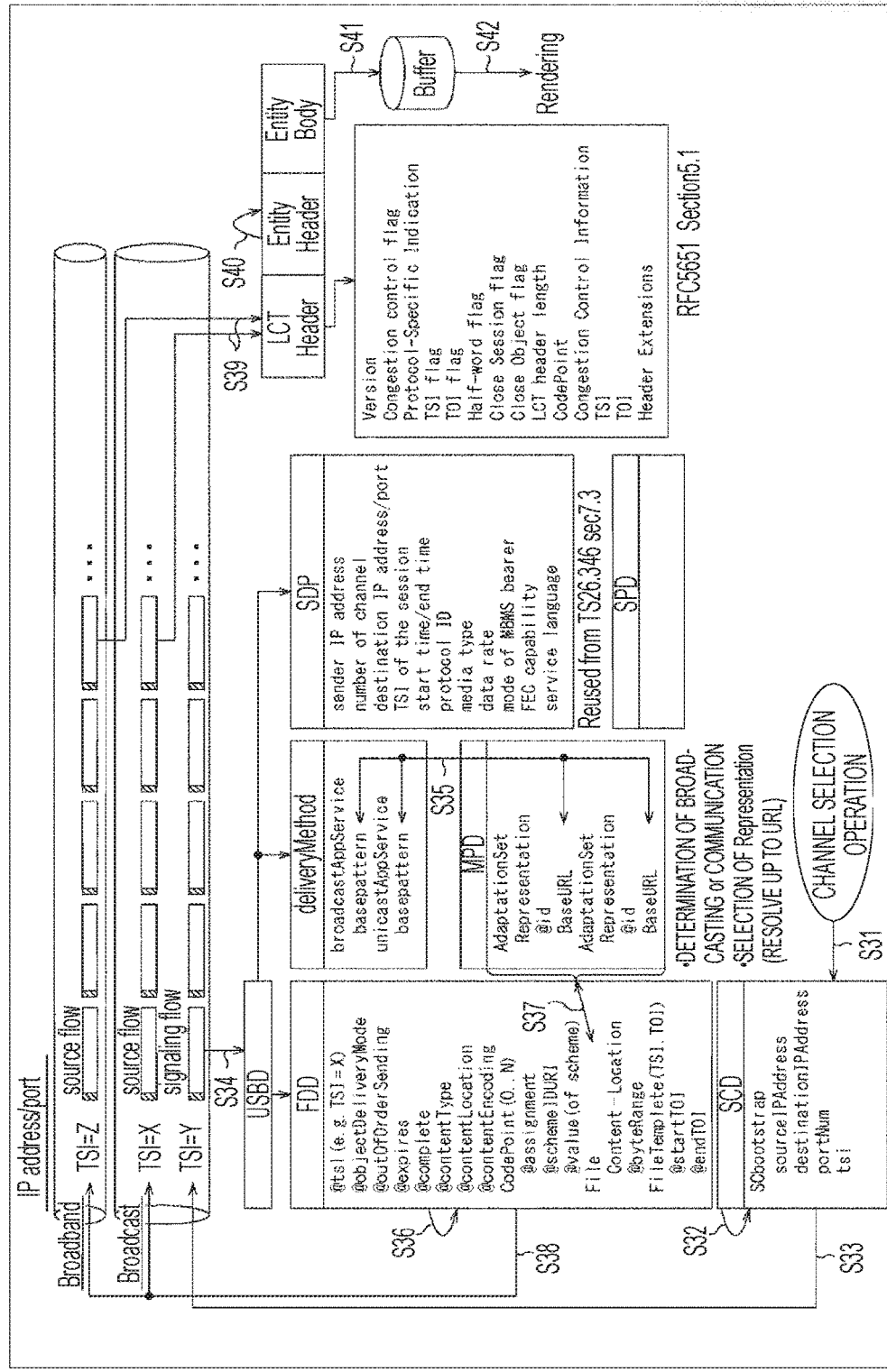
FIG. 16 is a diagram that illustrates a channel selection process performed in a case where data is transmitted using broadcasting and communication.

FIG. 16 is a diagram that illustrates a channel selection process performed in a case where data is transmitted using broadcasting and communication.

In the case illustrated in FIG. 16, a transmitter of a broadcasting station transmits components configuring each service, the SCS, and the like by using a broadcasting wave of digital broadcasting using the IP transmission system. In the digital broadcasting, the ID system described above is employed. In the example illustrated in FIG. 16, as a FLUTE session transmitting components and the SCS, a source flow (TSI=X) and a signaling flow (TSI=Y) are transmitted. In addition, in the LCT header of an LCT packet, filtering information can be arranged.

In the case illustrated in FIG. 16, a server on the Internet performs adaptive streaming distribution of components of a video, an audio, and the like. This streaming distribution is compliant with the standards of the MPEG-DASH, and, in the example illustrated in FIG. 16, a source flow (TSI=Z) is transmitted.

As illustrated in FIG. 16, when a channel selection operation of a specific service is performed by a user (S31), a receiver installed to each house or the like acquires SC bootstrap information of the SCD acquired at the time of initial scanning or the like (S32). The receiver extracts an LCT packet satisfying the filtering conditions of the IP address, the port number, and the TSI based on the SC bootstrap information. Here, since the LCT packet of the signaling flow is extracted, the LCT packet having TSI=Y as the value of the TSI of the LCT header is extracted (S33).

Here, in the signaling flow, as signaling data, since a USED, an MPD, an SDP, an SPD, and the like are transmitted, the receiver acquires the USBD, the MPD, the SDP, and the SPD (S34). At this time, in the USBD, since the FDD and the deliveryMethod are described, the receiver determines whether components configuring a specific service selected as a channel are transmitted through broadcasting or communication by using the deliveryMethod and the MPD (S35). In other words, by performing matching between the deliveryMethod and the MPD, it is determined that a representation corresponding to the basepattern of broadcastAppService is transmitted through broadcasting, and a representation corresponding to the basepattern of unicastAppService is transmitted through communication.

Since the BaseURL of the Representation of the MPD and the content-location of the file of the FDD match each other (S36 and S37), in a case where components configuring a specific service are transmitted through broadcasting in accordance with the index information of the FDD, the receiver can acquire an LCT packet in which the data of the components is stored by accessing the source flow (TSI=X) (S38). On the other hand, in a case where the components configuring a specific service are transmitted through communication, the receiver can acquire an LCT packet in which data of the components is stored (S39) by accessing the source flow (TSI=Z) in accordance with the index information of the FDD (S38).

In addition, in the LCT packet, in addition to the LCT header, an entity header is added, and, for example, information that dynamically changes or the like can be arranged (S40). Then, by storing data of a component restored from the LCT packet in a buffer (S41) and performing a rendering process, the receiver outputs a video and an audio corresponding to the components (S42).

As above, in the operation example 4, in a case where data transmitted through broadcasting and communication at the time of selecting a channel is used, components configuring a specific service selected as a channel can be acquired by using the SCD, the USBD (the FDD and deliveryMethod), and the MPD. In such a case, basically, the SDP and the SPD do not need to be used.

<5. Configuration of Broadcasting Communication System>

(Example of Configuration of Broadcasting Communication System)

Figure 17:
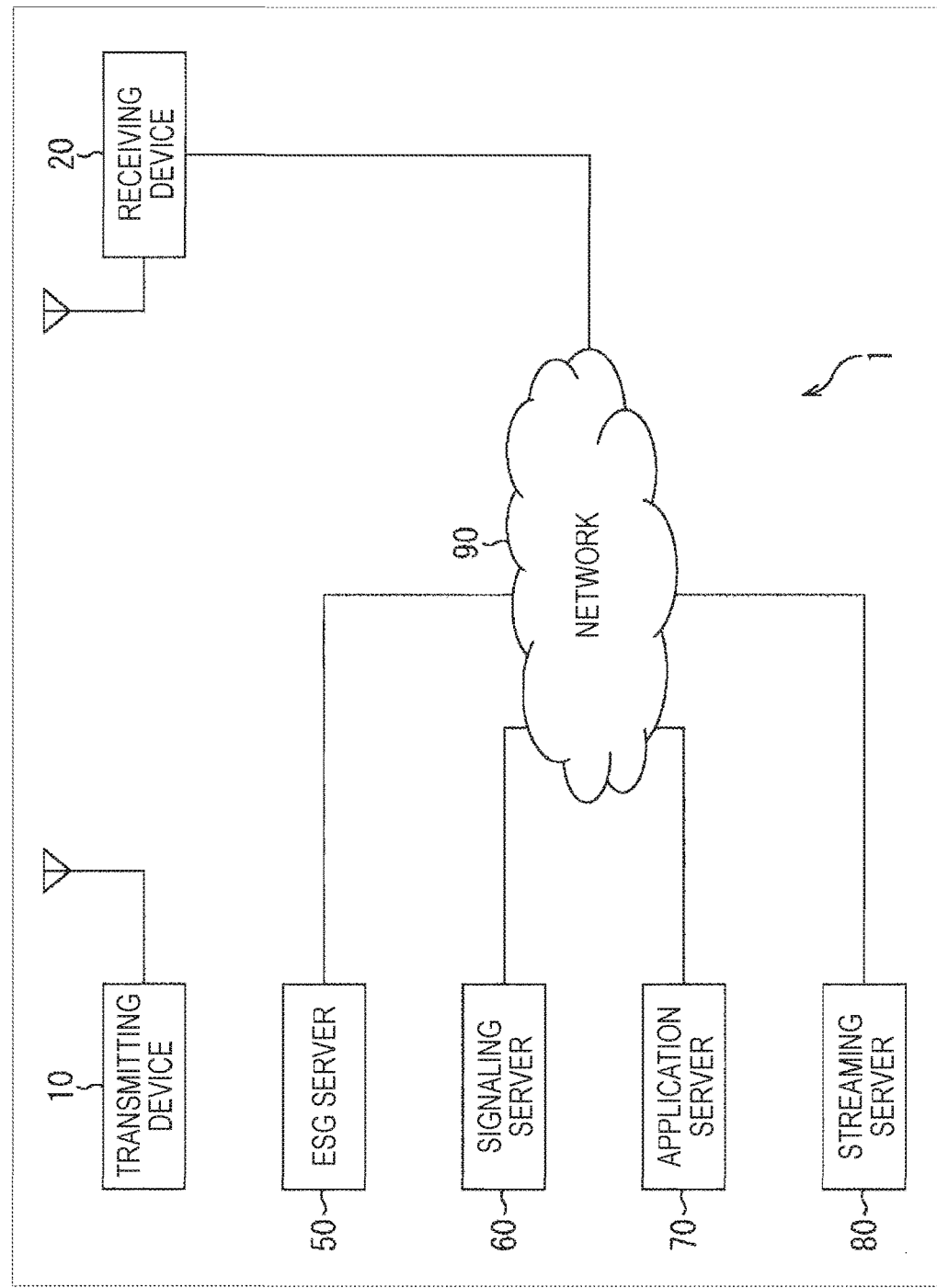
FIG. 17 is a diagram that illustrates the configuration of a broadcasting communication system according to an embodiment of the present technology.

FIG. 17 is a diagram that illustrates the configuration of a broadcasting communication system according to an embodiment of the present technology.

The broadcasting communication system 1 is a system used for providing various services by linking broadcasting and communication.

As illustrated in FIG. 17, the broadcasting communication system 1 is configured by: a transmitting device 10; a receiving device 20; an ESG server 50; a signaling server 60; an application server 70; and a streaming server 80. In addition, a network 90, for example, is configured by the Internet or the like, and the receiving device 20, the ESG server 50, the signaling server 60, the application server 70, and the streaming server 80 are connected to each other.

The transmitting device 10 transmits broadcasting contents such as programs and CMs by using a broadcasting wave of digital broadcasting using the IP transmission system. Here, the broadcasting contents are configured by components of a video, an audio, a subtitle, and the like. In addition, the transmitting device 10 transmits signaling data (LLS and SCS) together with the components by using a broadcasting wave of digital broadcasting using the IP transmission system.

Here, the transmitting device 10 corresponds to the transmitter described above.

The receiving device 20 receives a broadcasting wave (broadcasting signal) transmitted from the transmitting device 10. The receiving device 20 acquires components of a video, an audio, and the like based on signaling data acquired from the broadcasting signal and outputs a video and an audio of a broadcasting content such as a program.

Here, the receiving device 20 corresponds to the receiver described above. The receiving device 20 may be configured as a single unit including a display and a speaker or may be configured to be built in a television set, a video recorder, or the like.

The ESG server 50 manages an Electronic Service Guide (ESG) and provides the ESG through the network 90. The ESG server 50, for example, is provided by a broadcasting organization, an ESG production company, or the like.

The receiving device 20 acquires the ESG by accessing the ESG server 50 through the network 90 based on the signaling data acquired from the broadcasting signal. The receiving device 20 accumulates or displays the ESG acquired from the ESG server 50.

The signaling server 60 manages Service Channel Signaling (SCS) and provides the SCS through the network 90. In addition, the signaling server 60, for example, is provided by a broadcasting organization.

The receiving device 20 acquires SCS by accessing the signaling server 60 through the network 90 based on signaling data acquired from a broadcasting signal. The receiving device 20, for example, acquires components based on the SCS acquired from the signaling server 60.

The application server 70 manages applications and provides the applications through the network 90. The application server 70, for example, is provided by a broadcasting organization, an application producing company, or the like.

The receiving device 20 acquires an application by accessing the application server 70 through the network 90 based on signaling data acquired from a broadcasting signal. The receiving device 20 displays the application acquired from the application server 70.

The streaming server 80 accumulates communication contents such as programs and CMs. The communication contents are configured by components of a video, an audio, a subtitle, and the like. The streaming server 80 performs streaming distribution of the communication contents through the network 90 in response to a request from the receiving device 20. The streaming server 80, for example, is provided by a broadcasting organization.

The receiving device 20, based on control data, acquires components of a video and an audio that are distributed in a streaming mariner from the streaming server 80 through the network 90 and outputs a video and an audio of a communication content such as a program.

The broadcasting communication system 1 is configured as above. Next, as a detailed configuration of each device configuring the broadcasting communication system 1 illustrated in FIG. 17, the configurations of the transmitting device 10 and the receiving device 20 will be described with reference to FIGS. 18 and 19. Here, detailed configurations of the ESG server 50, the signaling server 60, the application server 70, and the streaming server 80 will be omitted.

(Example Configuration of Transmitting Device)

Figure 18:
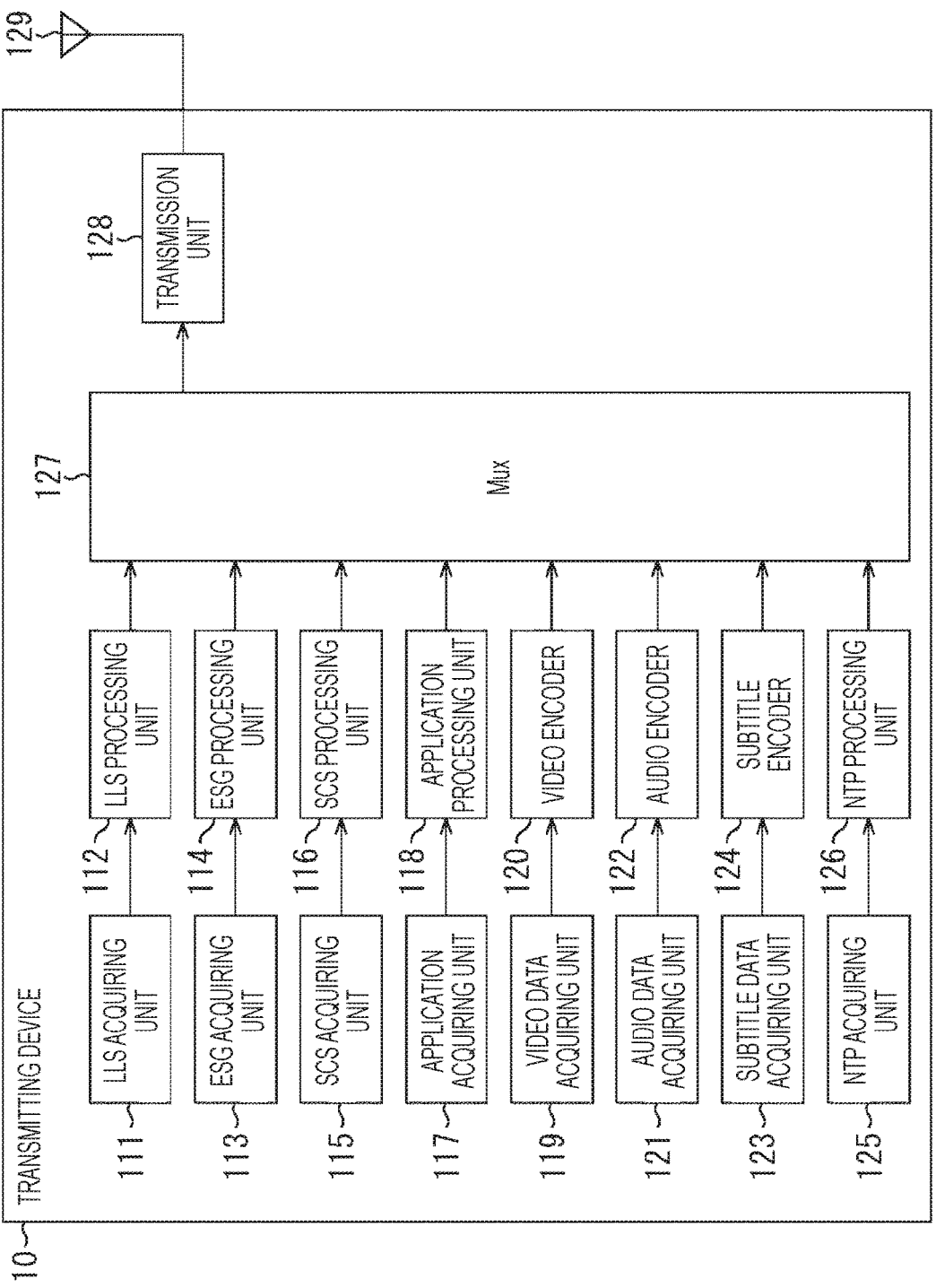
FIG. 18 is a diagram that illustrates the configuration of a transmitting device according to an embodiment of the present technology.

FIG. 18 is a diagram that illustrates the configuration of a transmitting device according to an embodiment of the present technology.

As illustrated in FIG. 18, the transmitting device 10 is configured by: an LLS acquiring unit 111; an LLS processing unit 112; an ESC acquiring unit 113; an ESG processing unit 114; an SCS acquiring unit 115; an SCS processing unit 116; an application acquiring unit 117; an application processing unit 118; a video data acquiring unit 119; a video encoder 120; an audio data acquiring unit 121; an audio encoder 122; a subtitle data acquiring unit 123; a subtitle encoder 124; an NTP acquiring unit 125; an NTP processing unit 126; a Mux 127; and a transmission unit 128.

The LLS acquiring unit 111 acquires a Service Configuration Description (SCD) and the like transmitted as Low Layer Signaling (LLS) from a built-in storage, an external server, or the like and supplies the acquired SCD and the like to the LLS processing unit 112. The LLS processing unit 112 performs predetermined signal processing, which is used for transmission using a broadcasting wave of digital broadcasting of the IP transmission system, for the LLS supplied from the LLS acquiring unit 111 and supplies the processed LLS to the Mux 127.

The ESC; acquiring unit 113 acquires an Electronic Service Guide (ESG) from a storage, an external server, or the like and supplies the acquired ESG to the ESG processing unit 114. The ESG processing unit 114 performs predetermined processing, which, for example, is used for transmission using a FLUTE session, for the ESG supplied from the ESG acquiring unit 113 and supplies the processed ESG to the Mux 127.

The SCS acquiring unit 115 acquires Service Channel Signaling (SCS) from a storage, an external server, or the like and supplies the acquired SCS to the SCS processing unit 116. The SCS processing unit 116 performs predetermined processing, which, for example, is used for transmission using a FLUTE session, for the SCS supplied from the SCS acquiring unit 115 and supplies the processed SCS to the Mux 127.

The application acquiring unit 117 acquires an application from a storage, an external server, or the like and supplies the acquired application to the application processing unit 118. The application processing unit 118 performs predetermined processing, which is used for transmission, for example, using a FLUTE session, for the application supplied from the application acquiring unit 117 and supplies the processed application to the Mux 127.

The video data acquiring unit 119 acquires video data as a component from a storage, an external server, a camera, or the like and supplies the acquired video data to the video encoder 120. The video encoder 120 codes the video data supplied from the video data acquiring unit 119 in compliance with a coding system of a Moving Picture Experts Group (MPEG) or the like and supplies the coded video data to the Mux 127.

The audio data acquiring unit 121 acquires audio data as a component from a storage, an external server, a microphone, or the like and supplies the acquired audio data to the audio encoder 122. The audio encoder 122 codes the audio data supplied from the audio data acquiring unit 121 in compliance with a coding system of an MPEG or the like and supplies the coded audio data to the Mux 127.

The subtitle data acquiring unit 123 acquires subtitle data as a component from a storage, an external server, or the like and supplies the acquired subtitle data to the subtitle encoder 124. The subtitle encoder 124 codes the subtitle data supplied from the subtitle data acquiring unit 123 in compliance with a predetermined coding system and supplies the coded subtitle data to the Mux 127.

In the case of transmission using a FLUTE session, the video data, the audio data, and the subtitle data are supplied to the Mux 127 after predetermined processing for transmission using a FLUTE session is performed therefor.

The NTP acquiring unit 125 acquires a Network Time Protocol (NTP) from a storage, an external server, or the like and supplies the acquired NTP to the NTP processing unit 126. The NTP processing unit 126 performs predetermined signal processing, which is used for transmission using a broadcasting wave of digital broadcasting of the IP transmission system, for the NTP supplied from the NTP acquiring unit 125 and supplies the processed NTP to the Mux 127.

The Mux 127 generates a BBP stream of the IP transmission system by multiplexing the LLS supplied from the LLS processing unit 112, the ESG supplied from the ESG processing unit 114, the SCS supplied from the SCS processing unit 116, the application supplied from the application processing unit 118, the video data supplied from the video encoder 120, the audio data supplied from the audio encoder 122, the subtitle data supplied from the subtitle encoder 124, and the NTP supplied from the NTP processing unit 126 and supplies the generated BBP stream to the transmission unit 128.

Here, the Mux 127 does not need to multiplex all the data supplied from blocks of a former stage. For example, in a case where an application or subtitle data is not transmitted, data is not supplied from the application processing unit 118 and the subtitle encoder 124, and the Mux 127 performs multiplexing with such data excluded. In the BBP stream, in the LCT header of an LCT packet in which data to be transmitted using a FLUTE session is stored, filtering information such as the compression information (CO), the type information (Type), the extended filter information (Filter_Extension), and the version. information (Data_Version) is arranged.

The transmission unit 128 transmits the BBP stream supplied from the Mux 127 through an antenna 129 as a broadcasting signal (broadcasting wave).

(Example of Configuration of Receiving Device)

Figure 19:
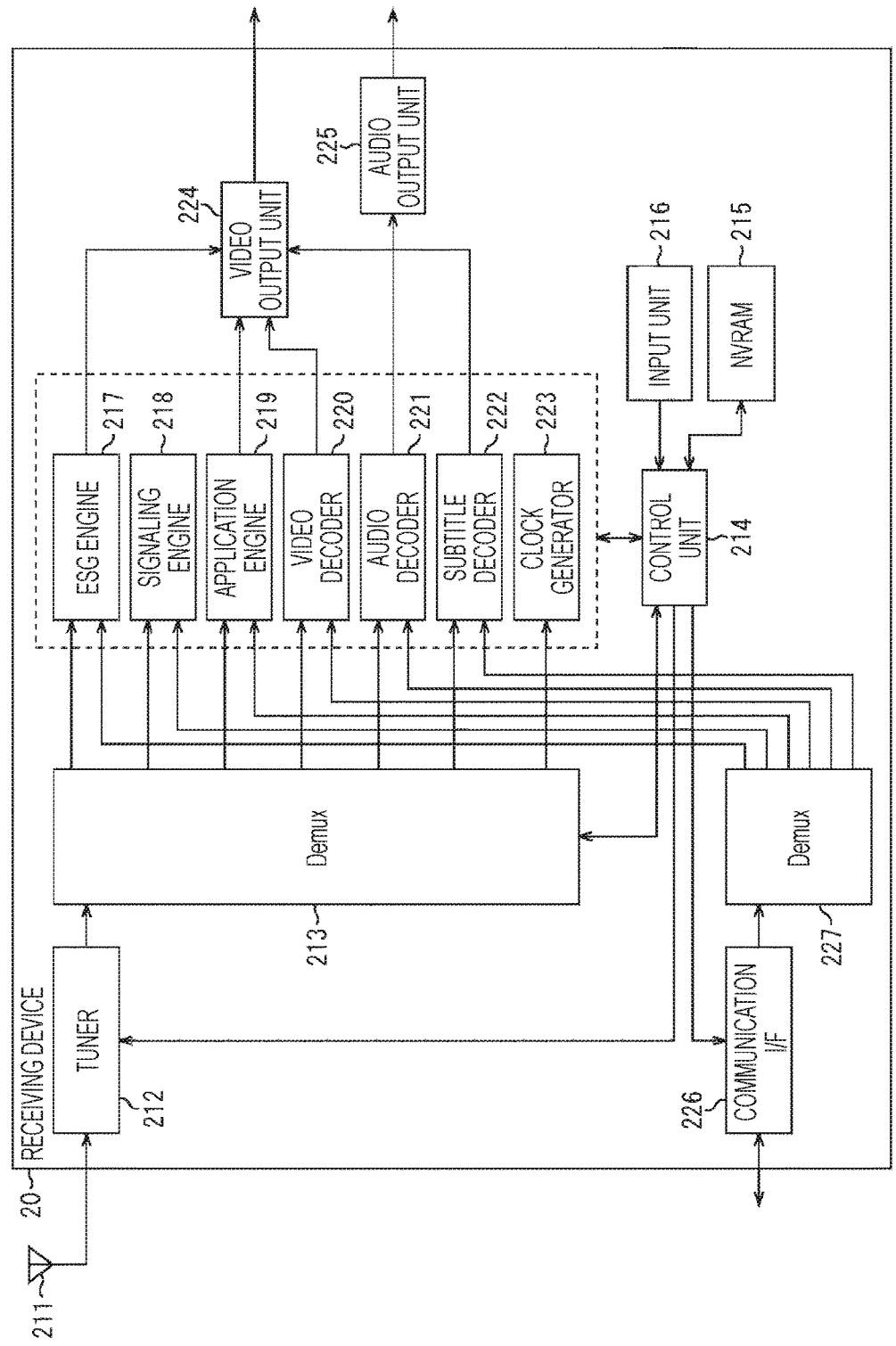
FIG. 19 is a diagram that illustrates the configuration of a receiving device according to an embodiment of the present technology.

FIG. 19 is a diagram that illustrates the configuration of a receiving device according to an embodiment of the present technology.

As illustrated in FIG. 19, the receiving device 20 is configured by: a tuner 212; a Demux 213; a control unit 214; an NVRAM 215; an input unit 216; an ESG engine 217; a signaling engine 218; an application engine 219; a video decoder 220; an audio decoder 221; a subtitle decoder 222; a clock generator 223; a video output unit 224; an audio output unit 225; a communication I/F 226; and a Demux 217.

The tuner 212, under the control of the control unit 214, extracts a broadcasting signal of a specific service instructed to be selected as a channel from a broadcasting signal (broadcasting wave) received by the antenna 211 and demodulates the extracted broadcasting signal and supplied a BBP stream of the IP transmission system acquired as a result thereof to the Demux 213.

The Demux 213, under the control of the control unit 214, separates the BBP stream of the IP transmission system supplied from the tuner 212 into LLS, an ESG, SCS, an application, video data, audio data, subtitle data, and an NTP and outputs the separated data to a block of a later stage.

More specifically, the Demux 213 has a function of a filtering processing unit and performs a filtering process based on the BBP header added to each packet. In this way, the LLS is supplied to the control unit 214. In addition, the Demux 213 performs a filtering process based on the IP header and the UDP header added to each packet. In this way, the NTP is supplied to the clock generator 223.

Furthermore, the Demux 213 performs a filtering process based on the filtering information of the LCT header added to an LCT packet transmitted in a FLUTE session. In this filtering process, the filtering is performed using at least one of the compression information (CO), the type information (Type), the extended filter information (Filter_Extension), and the version information (Data_Version) as a filtering condition.

As a result of this filtering process, the LCT packet in which the ESG, the SCS, and data of the application are stored is supplied to the ESG engine 217, the signaling engine 218, and the application engine 219. In addition, the video data, the audio data, and the subtitle data are respectively supplied to the video decoder 220, the audio decoder 221, and the subtitle decoder 222.

The control unit 214 controls the operation of each unit of the receiving device 20. The NVRAM 215 is a nonvolatile memory and records various kinds of data under the control of the control unit 214. In addition, the control unit 214 controls the operation of each unit of the receiving device 20 based on an operation signal corresponding to a user's operation supplied from the input unit 216.

For example, the control unit 214 records channel information (channel selection information) acquired from the LLS (for example, the SCD) at the time of initial scanning or the like in the NVRAM 215. In a case where a channel selection operation is performed by a user, the control unit 214 controls a channel selection process performed by the tuner 212 based on channel information recorded in the NVRAM 215.

The ESG engine 217, under the control of the control unit 214, restores the file of the ESG from a packet of the ESG supplied from the Demux 213 and supplies video data corresponding to the electronic service guide to the video output unit 224. The video output unit 224, under the control of the control unit 214, supplies video data supplied from the ESG engine 217 to a display (not illustrated in the drawing) of a later stage. In this way, the electronic service guide is displayed on the display. The file of the ESG may be accumulated in a storage (not illustrated in the drawing).

The signaling engine 218, under the control of the control unit 214, restores the file of the SCS from a packet of the SCS supplied from the Demux 213 and supplies the restored file of the SCS to the control unit 214. The control unit 214 controls the operation of each unit based on the SCS supplied from the signaling engine 218.

The application engine 219, under the control of the control unit 214, restores the file of the application from a packet. of the application supplied from the Demux 213 and supplies video data corresponding to the application to the video output unit 224. The video output unit 224, under the control of the control unit 214, supplies the video data supplied from the application engine 219 to a display of a later stage. In this way, on the display, for example, an application of a weather forecast or the like is displayed.

The video decoder 220, under the control of the control unit 214, restores video data (the file thereof) from a packet of the video data supplied from the Demux 213, for example, decodes the video data using a decoding system corresponding to the video encoder 120 (FIG. 18), and supplies the decoded video data to the video output unit 224. The video output unit 224, under the control of the control unit 214, outputs the video data supplied from the video decoder 220 to a display of a later stage. In this way, on the display, for example, a video of a program or the like is displayed.

The audio decoder 221, under the control of the control unit 214, restores audio data (the file thereof) from a packet of the audio data supplied from the Demux 213, for example, decodes the audio data using a decoding system corresponding to the audio encoder 122 (FIG. 18), and supplies the decoded audio data to the audio output unit 225. The audio output unit 225, under the control of the control unit 214, outputs the audio data supplied from the audio decoder 221 to a speaker (not illustrated in the drawing) of a later stage. In this way, an audio synchronized with the video of a program that is in the middle of display is output from the speaker.

The subtitle decoder 222, under the control of the control unit 214, restores subtitle data (the file thereof) from a packet of the subtitle data supplied from the Demux 213, for example, decodes the subtitle data using a decoding system corresponding to the subtitle encoder 124 (FIG. 18), and supplies the decoded subtitle data to the video output unit 224. The video output unit 224, under the control of the control unit 214, outputs the video data supplied from the subtitle decoder 222 to a display of a later stage. In this way, on the display, the subtitle is displayed, for example, with being superimposed on the video of a program.

The clock generator 223, under the control of the control unit 214, generates a clock signal based on the NTP supplied from the Demux 213. For example, this clock signal is supplied to the video decoder 220, the audio decoder 221, and the subtitle decoder 222, whereby synchronization among the video, the audio, and the subtitle is taken.

The communication I/F 226, under the control of the control unit 214, acquires an ESG by accessing the ESG server 50 through the network 90. The ESG acquired from the ESG server 50 is supplied to the ESG engine 217 through the Demux 227.

In addition, the communication I/F 226, under the control of the control unit 214, acquires SCS by accessing the signaling server 60 through the network 90. The SCS acquired from the signaling server 60 is supplied to the signaling engine 218 through the Demux 227.

Furthermore, the communication I/F 226, under the control of the control unit 214, acquires an application by accessing the application server 70 through the network 90. The application acquired from the application server 70 is supplied to the application engine 219 through the Demux 227.

In addition, the communication I/F 226, under the control of the control unit 214, receives streaming data of a communication content by accessing the streaming server 80 through the network 90 and supplies the received streaming data to the Demux 227. The Demux 227 separates the streaming data supplied from the communication I/F 226 into video data, audio data, and subtitle data and respectively supplies the video data, the audio data, and the subtitle data to the video decoder 220, the audio decoder 221, and the subtitle decoder 222.

In the example of the configuration of the receiving device 20 illustrated in FIG. 19, while the display and the speaker are configured to be disposed on the outside, a configuration in which the receiving device 20 includes a display and a speaker may be employed.

<6. Flow of Specific Process Performed by Each Device>

Next, the flow of a specific process performed by each device configuring the broadcasting communication system 1 illustrated in FIG. 17 will be described with reference to flowcharts illustrated in FIGS. 20 to 23.

(Transmission Process)

Figure 20:
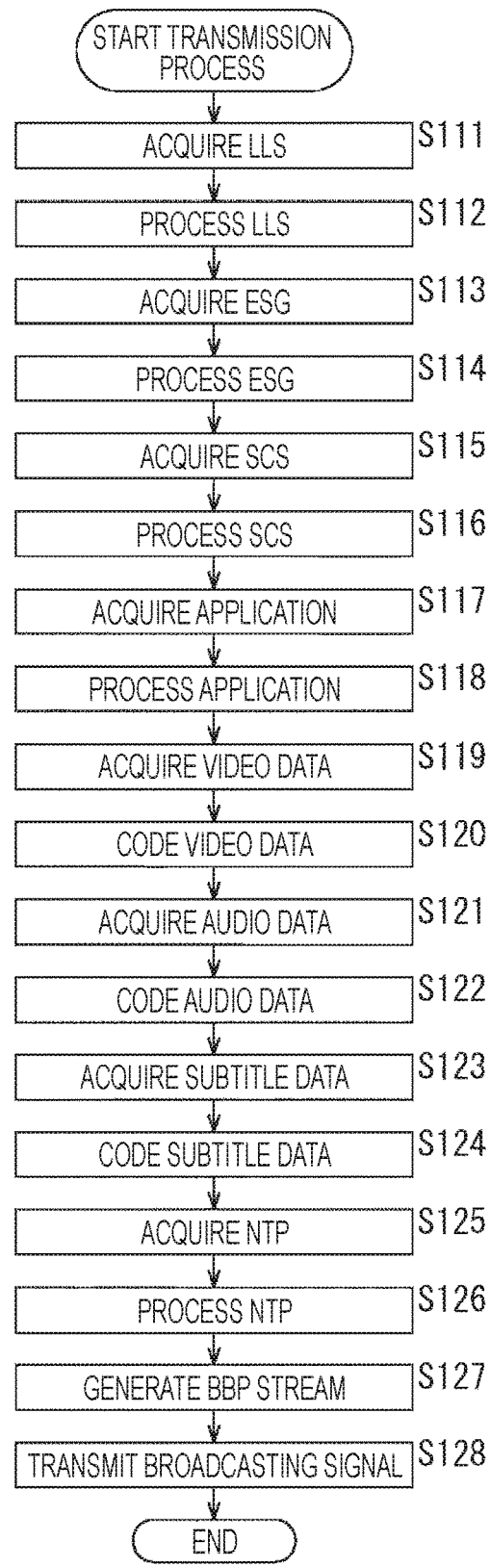
FIG. 20 is a flowchart that illustrates a transmission process.

First, a transmission process performed by the transmitting device 10 illustrated in FIG. 17 will be described with reference to the flowchart illustrated in FIG. 20.

In step S111, the LLS acquiring unit 111 acquires a Service Configuration Description (SCD) and the like transmitted as Low Layer Signaling (LLS) from a storage or the like and supplies the SCD and t e like that have been acquired to the LLS processing unit 112. In step S112, the LLS processing unit 112 performs predetermined signal processing, which is used for transmission using a broadcasting wave of digital broadcasting of the IP transmission system, for the LLS supplied from the LLS acquiring unit 111 and supplies the processed LLS to the Mux 127.

In step S113, the ESG acquiring unit 113 acquires an Electronic Service Guide (ESG) from a storage or the like and supplies the acquired ESG to the ESG processing unit 114. In step S114, the ESG processing unit 114 performs predetermined processing, which, for example, is used for transmission using a FLUTE session, for the ESG supplied from the ESG acquiring unit 113 and supplies the processed ESG to the Mux 127.

In step S115, the SCS acquiring unit 115 acquires Service Channel Signaling (SCS) from a storage or the like and supplies the acquired SCS to the SCS processing unit 116. In step S116, the SCS processing unit 116 performs predetermined processing, which, for example, is used for transmission using a FLUTE session, for the SCS supplied from the SCS acquiring unit 115 and supplies the processed SCS to the Mux 127.

In step S117, the application acquiring unit 117 acquires an application from a storage or the like and supplies the acquired application to the application processing unit 118. In step S118, the application processing unit 118 performs predetermined processing, which is used for transmission, for example, using a FLUTE session, for the application supplied from the application acquiring unit 117 and supplies the processed application to the Mux 127.

In step S119, the video data acquiring unit 119 acquires video data as a component from a storage or the like and supplies the acquired video data to the video encoder 120. In step S120, the video encoder 120 codes the video data supplied from the video data acquiring unit 119 in compliance with a coding system of the MPEG or the like and supplies the coded video data to the Mux 127.

In step S121, the audio data acquiring unit 121 acquires audio data as a component from a storage or the like and supplies the acquired audio data to the audio encoder 122. In step S122, the audio encoder 122 codes the audio data supplied from the audio data acquiring unit 121 in compliance with a coding system of the MPEG or the like and supplies the coded audio data to the Mux 127.

In step S123, the subtitle data acquiring unit 123 acquires subtitle data as a component from a storage or the like and supplies the acquired subtitle data to the subtitle encoder 124. In step S124, the subtitle encoder 124 codes the subtitle data supplied from the subtitle data acquiring unit 123 in compliance with a predetermined coding system and supplies the coded subtitle data to the Mux 127.

In step S125, the NTP acquiring unit 125 acquires a Network Time Protocol (NTP) from a storage or the like and supplies the acquired NTP to the NTP processing unit 126. In step S126, the NTP processing unit 126 performs predetermined signal processing, which is used for transmission using a broadcasting wave of digital broadcasting of the IP transmission system, for the NTP supplied from the NTP acquiring unit 125 and supplies the processed NTP to the Mux 127.

In step S127, the Mux 127 generates a BBP stream of the IP transmission system by multiplexing the LLS supplied from the LLS processing unit 112, the ESG supplied from the ESG processing unit 114, the SCS supplied from the SCS processing unit 116, the application supplied from the application processing unit 118, the video data supplied from the video encoder 120, the audio data supplied from the audio encoder 122, the subtitle data supplied from the subtitle encoder 124, and the NTP supplied from the NTP processing unit 126 and supplies the generated BBP stream to the transmission unit 128.

Here, the Mux 127 does not need to multiplex all the data supplied from blocks of a former stage. In the BBP stream, in the LCT header of an LCT packet in which data to be transmitted using a FLUTE session is stored, filtering information such as the compression information (CO), the type information (Type), the extended filter information (Filter_Extension) and the version information (Data_Version) is arranged.

In step S128, the transmission unit 128 transmits the BBP stream supplied from the Mux 127 through an antenna 129 as a broadcasting signal (broadcasting wave). When the process of step S128 ends, the transmission process illustrated in FIG. 20 ends.

As above, the transmission process has been described.

(Channel Selection Process)

Figure 21:
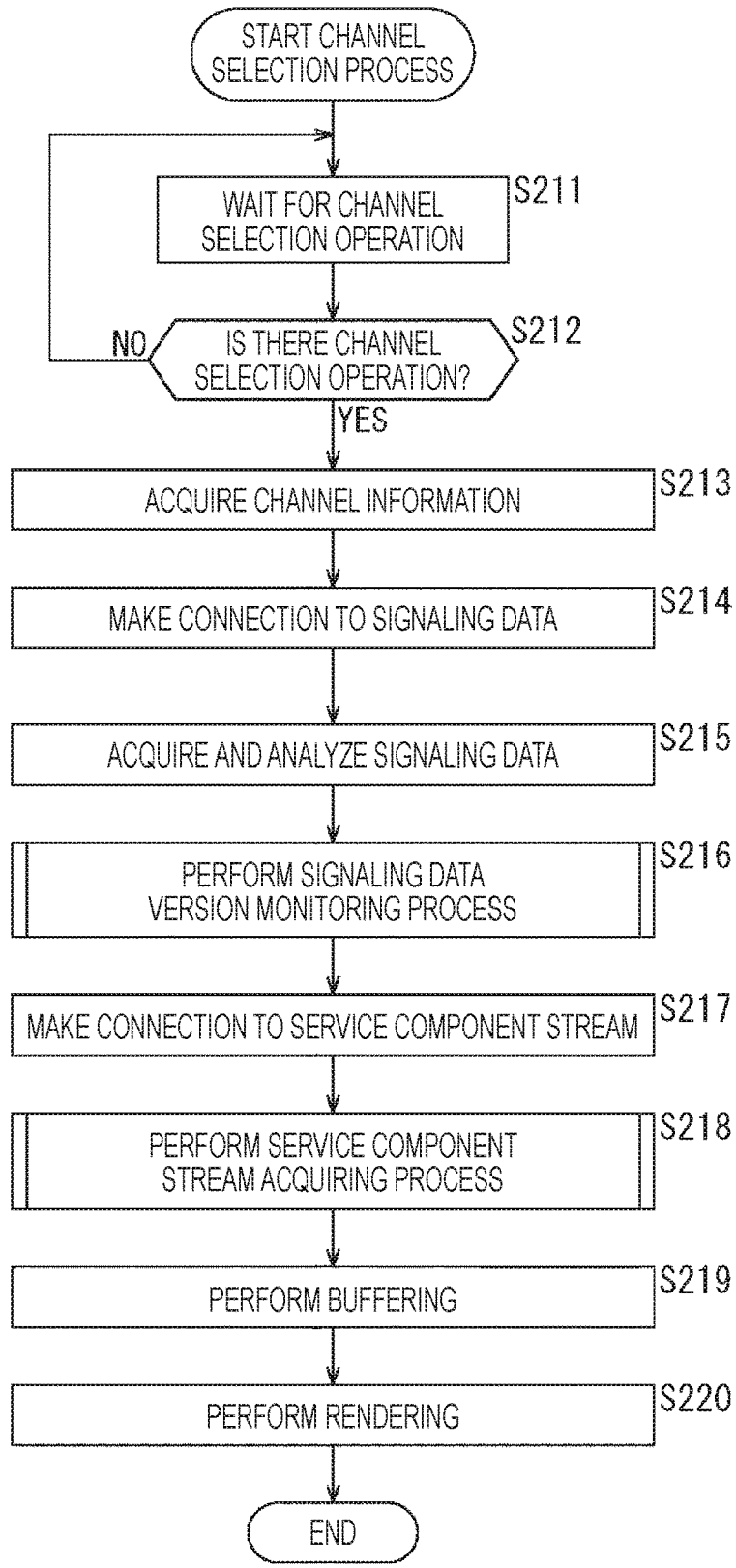
FIG. 21 is a flowchart that illustrates a channel selection process.

Next, the channel selection process performed by the receiving device 20 illustrated in FIG. 17 will be described with reference to a flowchart illustrated in FIG. 21.

In step S211, an operation signal supplied from the input unit 216 is monitored by the control unit 214, and the process waits until a channel selection operation is performed by a user. Then, in step S212, in a case where the channel selection operation is determined to be performed by the user, the process proceeds to step S213.

In step S213, the control unit 214 acquires channel information recorded in the NVRAM 215. In this way, the control unit 214 controls a channel selection process performed by the tuner 212 using channel information. In addition, the Demux 213, under the control of the control unit 214, is connected to signaling data transmitted in a FLUTE session (S214) and acquires and analyzes the signaling data (S215). Here, the SCS is acquired and analyzed.

In step S216, the Demux 213, under the control of the control unit 214, performs signaling data version monitoring process. According to this signaling data version monitoring process, in a case where signaling data is updated, signaling data after the update is acquired. Detailed contents of the signaling data version monitoring process will be described later with reference to a flowchart illustrated in FIG. 22.

In step S217, the Demux 213, under the control of the control unit 214, is connected to a service component stream transmitted in a FLUTE session. In step S218, the Demux 213, under the control of the control unit 214, performs a service component stream acquiring process. According to this service component stream acquiring process, components configuring a specific service selected as a channel are acquired. Detailed contents of the service component stream acquiring process will be described later with reference to a flowchart illustrated in FIG. 23.

In step S219, the control unit 214, by controlling the operation of each unit, stores data of the components acquired in the process of step S218 in the buffer (not illustrated in the drawing). In step S220, the control unit 214, by controlling the operation of each unit, performs a rendering process for the buffered components and outputs a video and an audio corresponding to the components. When the process of step S220 ends, the channel selection process illustrated in FIG. 21 ends.

As above, the channel selection process has been described.

(Signaling Data Version Monitoring Process)

Figure 22:
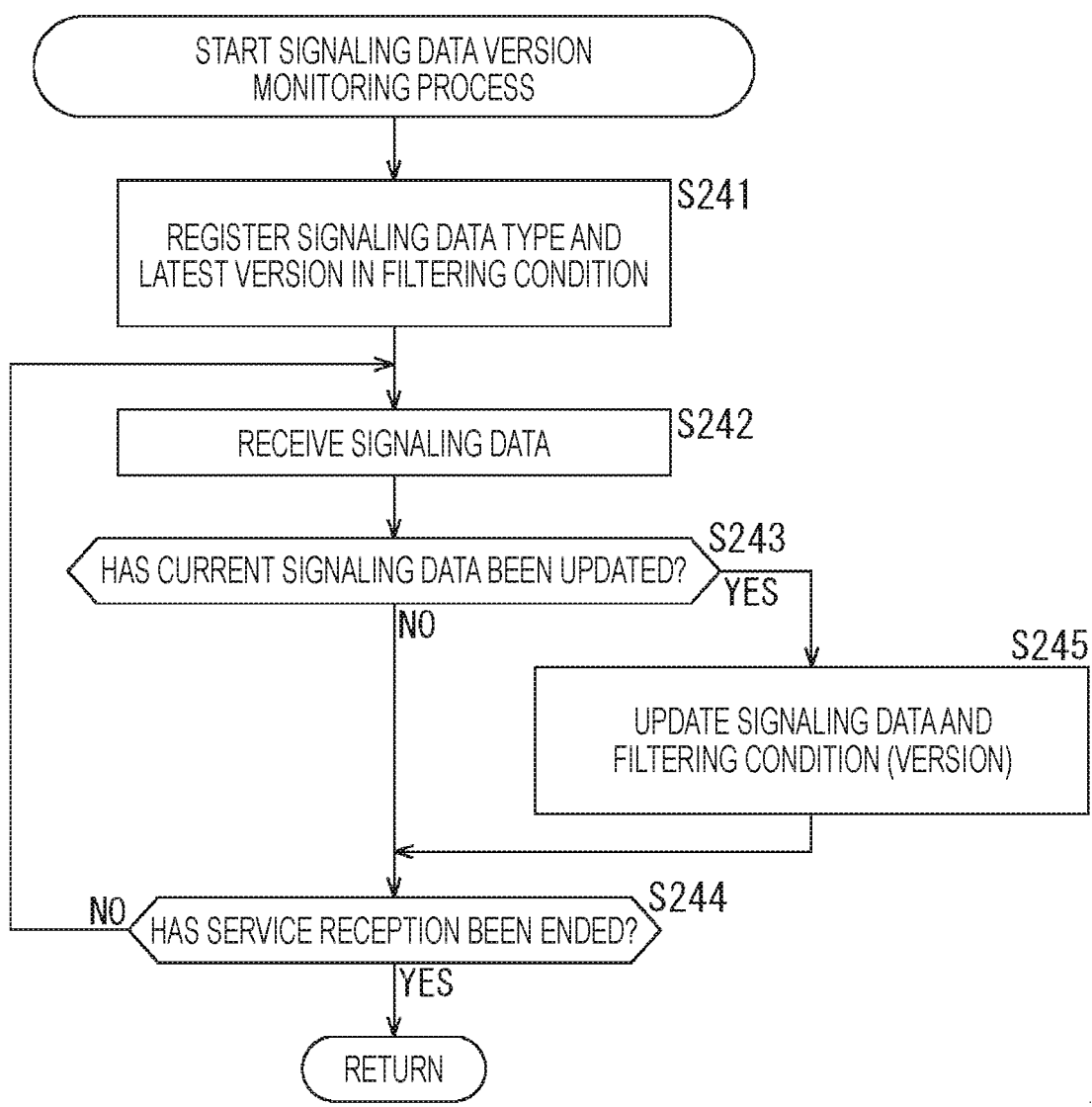
FIG. 22 is a flowchart that illustrates a detailed content of a signaling data version monitoring process.

Next, detailed contents of the signaling data version monitoring process corresponding to the process of step S216 illustrated in FIG. 21 will be described with reference to a flowchart illustrated in FIG. 22.

In step S241, the Demux 213 registers the type information of the signaling data and a latest version in the filtering condition. To the Demux 213, signaling data received by the tuner 212 through the antenna 211 is input (S242).

In step S243, the Demux 213 determines whether or not current signaling data has been updated by performing a filtering process using the filtering conditions registered in the process of step S241. Here, it is monitored whether or not the type information (Type) and the version information (Data_Version) arranged in the LCT header of the LCT packet satisfy the filtering conditions.

In step S243, in a case where the current signaling data is determined not to have been updated, the process proceeds to step S244. In step S244, is determined whether or riot the reception of the service has ended. In step S244, in a case where the reception of the service is determined not to have ended, the process is returned to step S242, and process of step S242 and subsequent steps thereto is repeated.

On the other hand, in step S243, in a case where the current signaling data is determined to have been updated, the process proceeds to step S245. In step S245, the Demux 213 extracts signaling data after the update satisfying the filtering condition and supplies the extracted signaling data to the signaling engine 218. In this way, for example, in a case where the version of the MPD is monitored, when the version of the MPD is upgraded from 1.0 to 2.0, the MPD of the version 2.0 after the update is acquired.

In addition, for example, the Demux 213 updates the filtering condition by incrementing the latest version of the filtering condition by one and prepares for a new update of the current filtering data. When the process of step S245 ends, the process proceeds to step S244.

Then, in step S244, until the reception of the service is determined to end, the process of steps S242 to S245 is repeated, and accordingly, at the time of updating the current signaling data, the current signaling data can be immediately acquired. On the other hand, in step S244, in a case where the reception of the service is determined to end, the process is returned to the process of step S216 illustrated in FIG. 21, and process of step S216 and subsequent steps thereto is performed.

As above, the signaling data version monitoring process has been described.

(Service Component Stream Acquiring Process)

Figure 23:
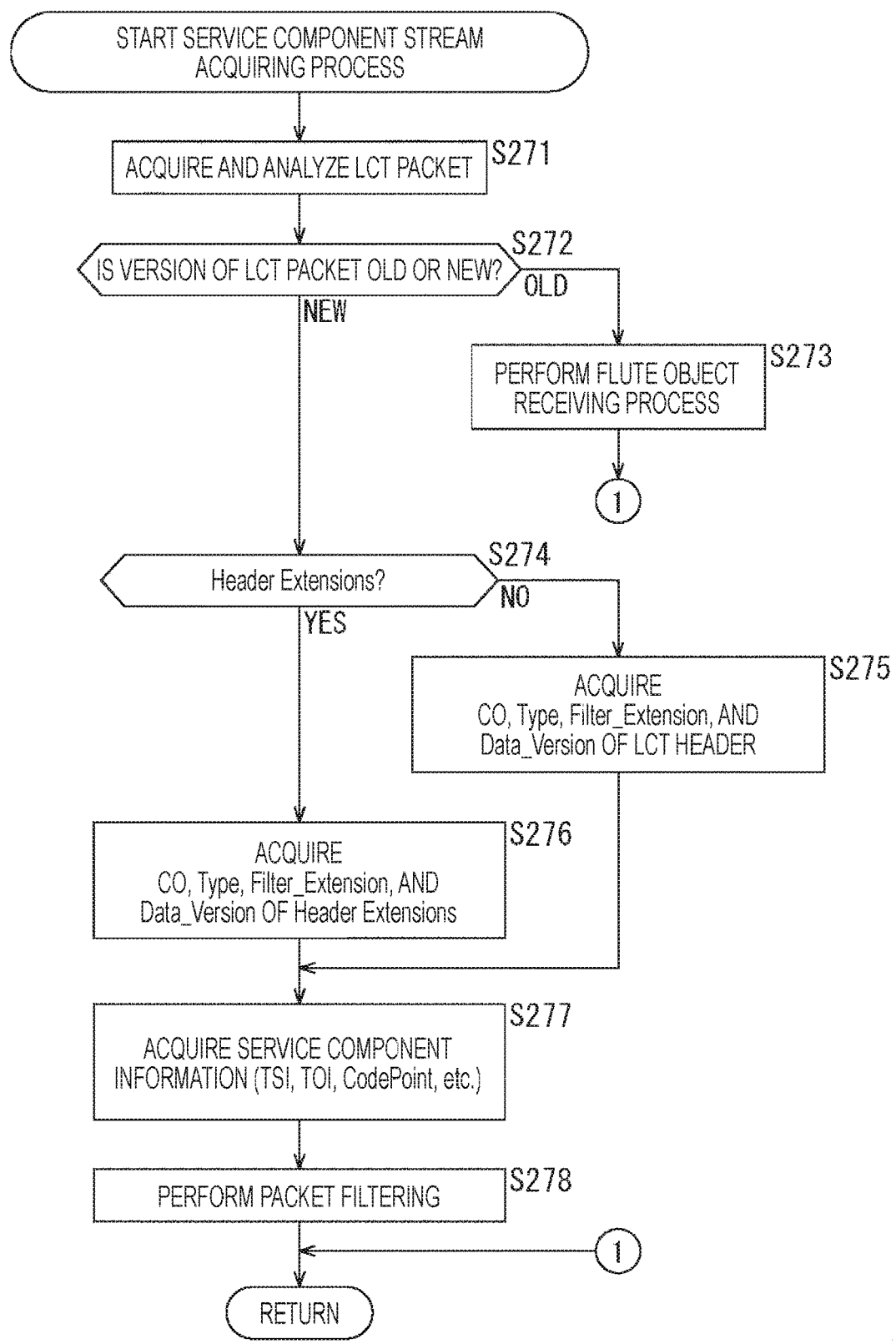
FIG. 23 is a flowchart that illustrates a detailed content of a service component stream acquiring process.

Finally, detailed contents of the service component stream acquiring process corresponding to the process of step S218 illustrated in FIG. 21 will be described with reference to a flowchart illustrated in FIG. 23.

In step S271, the Demux 213, under the control of the control unit 214, performs a filtering process and acquires and analyzes the LCT packet.

In step S272, the Demux 213 determines whether or not the version of the LCT packet is a new version (for example, a version 2.0) that is in correspondence with the present technology. In this determination process, the version (for example, "V" illustrated in FIG. 4) of the LCT packet arranged in the LCT header is checked.

In step S272, in a case where the version of the packet is determined to be an old version (for example, a version 1.0) not in correspondence with the present technology, the process proceeds to step S273. In step S273, a FLUTE object receiving process is performed, a specific file is restored from the FLUTE session by using the TSI and the TOI, and components configuring the specific service are acquired. Thereafter, the process is returned to the process of step S218 illustrated in FIG. 21, and process of step S218 and subsequent steps thereto is performed.

On the other hand, in step S272, in a case where the version of the LCT packet is determined to be a new version (for example, a version 2.0) that is in correspondence with the present technology, the process proceeds to step S274. In step S274, the Demux 213 determines whether or not the Header Extensions are arranged in the LCT header.

In step S274, Ma case where the Header Extensions are determined not to be arranged in the LCT header, the process proceeds to step S275. In this case, the arrangement pattern of the LCT header is Pattern 1 or Pattern 3, in step S275, the Demux 213 acquires the compression information (CO), the type information (Type), the extended filter information (Filter_Extension), and the version information (Data_Version) arranged in the LCT header.

On the other hand, in step S274, in a case where the Header Extensions are determined to be arranged in the LCT header, the process proceeds to step S276. In this case, since the arrangement pattern of the LCT header is Pattern 2, in step S276, the Demux 213 acquires the compression information (CO), the type information (Type), the extended filter information (Filter_Extension), and the version information (Data_Version) arranged in the Header Extensions of the LCT header.

When the filtering information is acquired by the process of step S275 or S276, the process proceeds to step S277. In step S277, the Demux 213 acquires the service component information from the LCT header. As this service component information, for example, a TSI, a TOI, a code point (CodePoint), and the like are acquired.

In step S278, the Demux 213, under the control of the control unit 214, performs a packet filtering process. According to this filtering process, a specific file is restored from the FLUTE session, and components configuring a specific service are acquired. When the process of step S278 ends, the process is returned to the process of step S218 illustrated in FIG. 21, and process of step S218 and subsequent steps thereto is performed.

As above, the service component stream acquiring process has been described.

In the description presented above, while "D" that is an abbreviation of "Description" is used as the name of t e signaling data, there are cases where "T" that is an abbreviation of "Table" is used. For example, there are cases where the Service Configuration Description (SCD) is described as a Service Configuration Table (SCT). In addition, for example, there are cases where the Service Parameter Description (SPD) is described as a Service Parameter Table (SPT). However, a difference between such names is a formal difference between "Description" and "Table", and there is no difference between substantial contents of signaling data. In the description presented above, the ESG is described as signaling data.

<7. Configuration of Computer>

A series of the processes described above can be performed either by hardware or by software. In a case where the series of the processes is performed by software, a program configuring the software is installed to a computer. Here, the computer includes a computer embedded in dedicated hardware, a computer capable of performing various functions by installing various programs, for example, a general-purpose personal computer, and the like.

Figure 24:
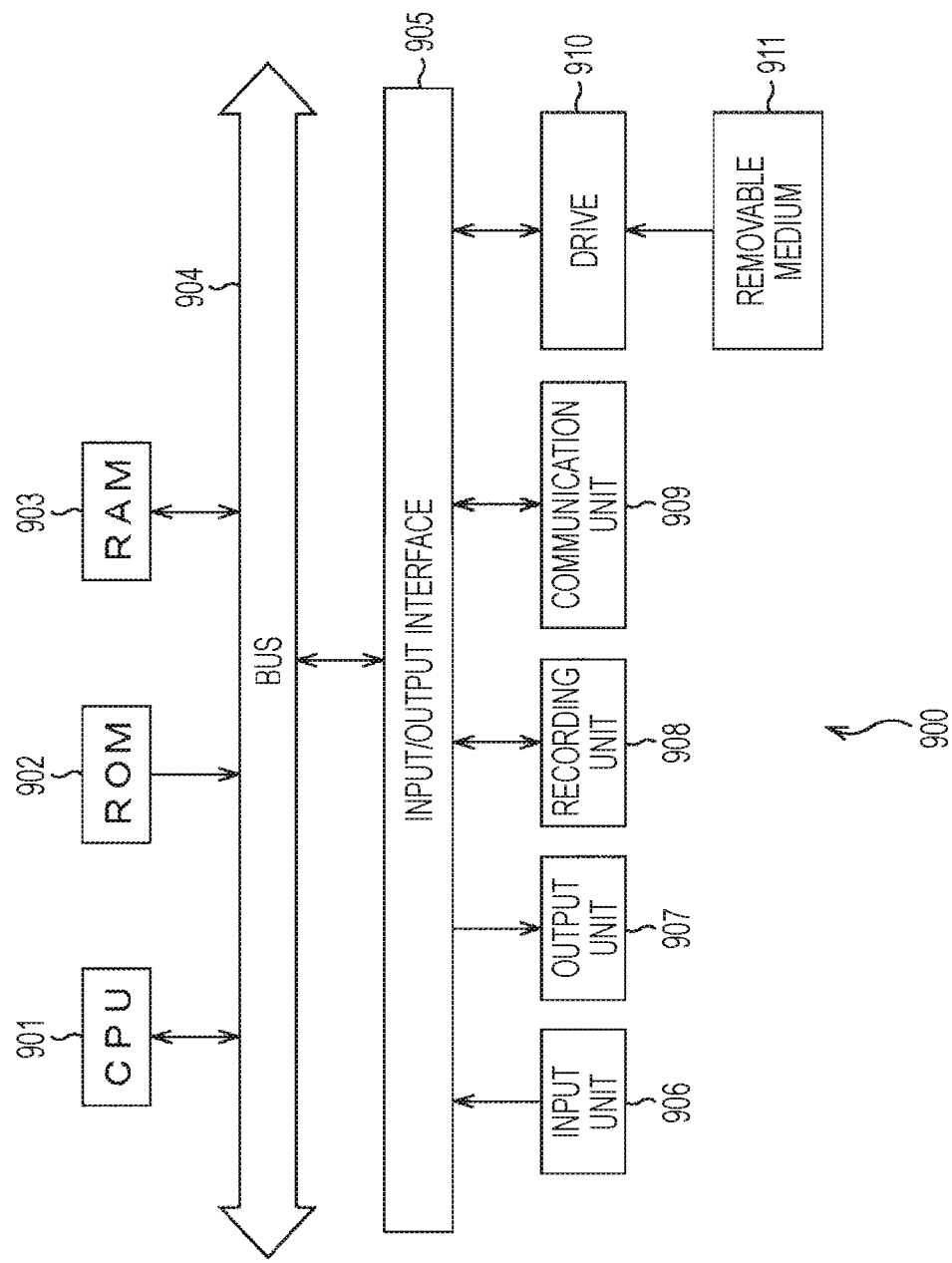
FIG. 24 is a diagram that illustrates an example of the configuration of a computer.

FIG. 24 is a diagram that illustrates an example of the hardware configuration of a computer that performs the series of processes described above by using a program.

In the computer 900, a Central Processing Unit (CPU) 901, a Read Only Memory (ROM) 902, and a Random Access Memory (RAM) 903 are interconnected through a bus 904. In addition, an input/output interface 905 is connected to the bus 904. An input unit 906, an output unit 907, a recording unit 908, a communication unit 909, and a drive 910 are connected to the input/output interface 905.

The input unit 906 is configured by a keyboard, a mouse, a microphone, and the like. The output unit 907 is configured by a display, a speaker, and the like. The recording unit 908 is configured by a hard disk, a non-volatile memory, and the like. The communication unit 909 is configured by a network interface and the like. The drive 910 drives a magnetic disk, an optical disc, a magneto-optical disk, or a removable medium 911 such as a semiconductor memory.

In the computer 900 configured as above, the CPU 901, for example, loads a program stored in the recording unit 908 into the RAM 903 through the input/output interface 905 and the bus 904 and executes the loaded program, thereby performing the series of the processes described above.

The program executed by the computer 900 (the CPU 901), for example, may be provided with being recorded on a removable medium 911 as a package medium or the like. In addition, the program may be provided through a wired or wireless transmission medium such as a local area network, the Internet, or digital satellite broadcast.

In the computer 900, by loading the removable medium 911 into the drive 910, the program can be installed to the recording unit 908 through the input/output interface 905. In addition, the program may be received by the communication unit 909 through a wired or wireless transmission medium and be installed to the recording unit 908. Furthermore, the program may be installed to the ROM 902 or the recording unit 908 in advance.

In addition, the program executed by the computer 900 may be a program that executes the processes in a time series along the sequence described in this specification or a program that executes the processes in a parallel manner or at necessary timing such as at the timing of being called.

Here, in this specification, a processing step describing the program causing the computer 900 to perform various processes does not necessarily need to be processed in a time series along the described sequence as a flowchart but includes a process (for example, a parallel process or a process using an object) that is performed in a parallel manner or an individual manner.

In addition, the program may be processed by one computer or may be processed by a plurality of computers in a distributed manner. Furthermore, the program may be transmitted to a remoted computer and be executed therein.

In this specification, a system represents a set of a plurality of constituent elements (a device, a module (component), and the like), and all the constituent elements do not need to be disposed in a same casing. Thus, a plurality of devices that are housed in separate casings and are connected through a network and one device in which a plurality of modules are housed in one casing are systems.

An embodiment according to the present technology is not limited to the embodiment described above, but various changes may be made therein in a range not departing from the concept of the present technology. For example, the present technology may take a configuration of cloud computing in which one function is divided and processed cooperatively by a plurality of devices through a network.

In addition, each step described in each flowchart described above may be either executed by one device or executed by a plurality of devices in a shared manner. Furthermore, in a case where a plurality of processes are included in one step, the plurality of processes included in the one step may be either executed by one device or executed by a plurality of devices in a shared manner.

The present technology may also take the following configurations.

(1)

A receiving device including:

a reception unit that receives a broadcasting wave of digital broadcasting using an Internet Protocol (IP) transmission system; and a filtering processing unit that performs a filtering process of a packet by using filtering information arranged in a header of the packet transmitted in a first layer that is a layer upper than an IP layer in layers of a protocol of the IP transmission system in the broadcasting wave.

(2)

The receiving device according to (1), wherein the packet is a Layered Coding Transport (LCT) packet transmitted using a File DPI Pry over Unidirectional Transport (FLUTE) session, the filtering information, in the LCT packet, is arranged in an LCT header, and first signaling data is arranged in an LCT payload, and the filtering processing unit, after resolving an IP address, a port number of a User Datagram Protocol (UDP), and a Transport Session identifier (TSI) of a specific service using second signaling data transmitted in a second layer that is a layer lower than the IP layer, performs a filtering process of the first signaling data stored in the LCT packet using the filtering information arranged in the LCT header of the LCT packet transmitted in the FLUTE session.

(3)

The receiving device according to (2), wherein the filtering information is arranged in a Transport Object Identifier (TOI) of the LCT header.

(4)

The receiving device according to (2), wherein the filtering information is arranged in an extended area of the LCT header.

(5)

The receiving device according to (2) or (3), wherein a part or all of the filtering information is arranged instead of a code point that is an area used according to an operation in the LCT header.

(6)

The receiving device according to any one of (2) to (5), wherein the filtering information includes at least one of compression information representing compression/no-compression of the first signaling data, type information representing a type of the first signaling data, extended filter information representing a filtering condition set for each type of the first signaling data, and version information representing a version of the first signaling data.

(7)

The receiving device according to (2), wherein the first signaling data is acquired from a server through a network.

(8)
The receiving device according to (2), wherein the first signaling data includes index information of the FLUTE session.

(9)
The receiving device according to (2),
wherein the first signaling data is Service Channel Signaling (SCS) or an Electronic Service Guide (ESG),
the second signaling data is Low Layer Signaling (LLS), and
a common IP address is assigned to components and SCS configuring a specific service transmitted using the FLUTE session.

(10)
A reception method of a receiving device, the reception method using the receiving device including:
receiving a broadcasting wave of digital broadcasting using an Internet Protocol (IP) transmission system; and
performing a filtering process of first signaling data stored in a packet by using filtering information arranged in a header of the packet transmitted in a first layer that is a layer upper than an IP layer in layers of a protocol of the IP transmission system in the broadcasting wave.

(11)
A transmitting device including:
a first acquisition unit that acquires one or a plurality of components configuring a service;
a second acquisition unit that acquires first signaling data; and
a transmission unit that transmits the first signaling data together with the components by using a broadcasting wave of digital broadcasting using an IP transmission system,
wherein, in the broadcasting wave, in a header of a packet, in which the first signaling data is stored, transmitted in a first layer that is a layer upper than an IP layer in layers of a protocol of the IP transmission system, filtering information used in a filtering process of the packet is arranged.

(12)
The transmitting device according to (11),
wherein the packet is an LCT packet transmitted using a FLUTE session,
the filtering information, in the LCT packet, is arranged in an LCT header, and the first signaling data is arranged in an LCT payload.

(13)
The transmitting device according to (12), wherein the filtering information is arranged in a TOI of the LCT header.

(14)
The transmitting device according to (12), wherein the filtering information is arranged in an extended area of the LCT header.

(15)
The transmitting device according to (12) or (13), wherein a part or all of the filtering information is arranged instead of a code point that is an area used according to an operation in the LCT header.

(16)
The transmitting device according to any one of (12) to (15), wherein the filtering information includes at least one of compression information representing compression/no-compression of the first signaling data, type information representing a type of the first signaling data, extended filter information representing a filtering condition set for each type of the first signaling data, and version information representing a version of the first signaling data.

(17)
The transmitting device according to (12), wherein the first signaling data is acquired from a server through a network.

(18)
The transmitting device according to (12), wherein the first signaling data includes index information of the FLUTE session.

(19)
The transmitting device according to (12),
wherein the first signaling data is SCS or an ESG,
second signaling data transmitted in a second layer that is a layer lower than the IP layer is LLS, and
a common IP address is assigned to components and SCS configuring a specific service transmitted using the FLUTE session.

(20)
A transmission method of a transmitting device, the transmission method using the transmitting device including:
acquiring one or a plurality of components configuring a service;
acquiring first signaling data; and
transmitting the first signaling data together with the components by using a broadcasting wave of digital broadcasting using an IP transmission system,
wherein, in the broadcasting wave, in a header of a packet, in which the first signaling data is stored, transmitted in a first layer that is a layer upper than an IP layer in layers of a protocol of the IP transmission system, filtering information used in a filtering process of the packet is arranged.

REFERENCE SIGNS LIST

1 Broadcasting communication system
10 Transmitting device
20 Receiving device
50 ESG server
60 Signaling server
70 Application server
80 Streaming server
90 Network
111 LLS acquiring unit
113 ESG acquiring unit
115 SCS acquiring unit
117 Application acquiring unit
119 Video data acquiring unit
121 Audio data acquiring unit
123 Subtitle data acquiring unit
125 NTP acquiring unit
127 Mux
128 Transmission unit
212 Tuner
213 Demux
214 Control unit
217 ESG engine
218 Signaling engine
219 Application engine
220 Video decoder
221 Audio decoder
222 Subtitle decoder
223 Clock generator
224 Video output unit
225 Audio output unit
226 Communication I/F
227 Demux
900 Computer
901 CPU

The invention claimed is:

1. A receiving device comprising:
circuitry configured to
receive a digital broadcast signal transmitted using an Internet Protocol (IP) transmission method;
determine whether to extract a Layered Coding Transport (LCT) packet, from a plurality of LCT packets included in the digital broadcast signal, based on filtering information arranged in an LCT header of the LCT packet transmitted in a first layer that is higher than an IP layer of a protocol of the IP transmission method in the digital broadcast signal, and
process first signaling data stored in the extracted LCT packet when the LCT packet is determined to be extracted, wherein
the LCT packet is transmitted using a session of the first layer,
the filtering information includes compression information representing compression/no-compression of the first signaling data, filter information representing a filtering condition of the first signaling data, and version information representing a version of the first signaling data, and
the filter information indicates which of a plurality of types of the first signaling data is contained in the first signaling data.

2. The receiving device according to claim 1, wherein the first layer is an extension of a File Delivery over Unidirectional Transport (FLUTE).

3. The receiving device according to claim 2, wherein the filtering information is arranged in an extended area of the LCT header.

4. The receiving device according to claim 2, wherein a part or all of the filtering information is arranged in the LCT header of a first pattern instead of a code point that is an area used according to an operation in a LCT header of a second pattern.

5. The receiving device according to claim 2, wherein the first signaling data is acquired from a server through a network.

6. The receiving device according to claim 2, wherein the first signaling data includes index information of the session of the first layer.

7. The receiving device according to claim 2, wherein the first signaling data is Service Channel Signaling (SCS) or an Electronic Service Guide (ESG), and
a common IP address is assigned to components and the SCS configuring a specific service transmitted using the session of the first layer.

8. The receiving device according to claim 1, wherein the filtering information is arranged in a Transport Object Identifier (TOI) of the LCT header.

9. The receiving device according to claim 1, wherein the filter information represents the filtering condition set for each of the plurality of types of the first signaling data.

10. The receiving device according to claim 9, wherein the first layer is based on a File Delivery over Unidirectional Transport (FLUTE).

11. A reception method of a receiving device, the reception method comprising:
receiving a digital broadcast signal transmitted using an Internet Protocol (IP) transmission method;
determine whether to extract a Layered Coding Transport (LCT) packet, from a plurality of LCT packets included in the digital broadcast signal, based on filtering information arranged in an LCT header of the LCT packet transmitted in a first layer that is higher than an IP layer of a protocol of the IP transmission method in the digital broadcast signal; and
processing first signaling data stored in the extracted LCT packet when the LCT packet is determined to be extracted, wherein
the LCT packet is transmitted using a session of the first layer, and
the filtering information includes compression information representing compression/no-compression of the first signaling data, filter information representing a filtering condition of the first signaling data, and version information representing a version of the first signaling data, and
the filter information indicates which of a plurality of types of the first signaling data is contained in the first signaling data.

12. A transmitting device comprising:
circuitry configured to
acquire one or a plurality of components configuring a service;
acquire first signaling data; and
transmit the first signaling data together with the components via a digital broadcast signal transmitted using an Internet Protocol (IP) transmission method, wherein
the digital broadcast signal includes a Layered Coding Transport (LCT) packet, in which the first signaling data is stored and that is transmitted in a first layer that is higher than an IP layer of a protocol of the IP transmission method,
a LCT header of the LCT packet includes filtering information used to determine whether to extract the packet for processing the first signaling data,
the LCT packet is transmitted using a session of the first layer,
the filtering information includes compression information representing compression/no-compression of the first signaling data, filter information representing a filtering condition of the first signaling data, and version information representing a version of the first signaling data, and
the filter information indicates which of a plurality of types of the first signaling data is contained in the first signaling data.

13. The transmitting device according to claim 12, wherein
the first layer is an extension of a File Delivery over Unidirectional Transport (FLUTE).

14. The transmitting device according to claim 13, wherein the filtering information is arranged in an extended area of the LCT header.

15. The transmitting device according to claim 13, wherein a part or all of the filtering information is arranged in the LCT header of a first pattern instead of a code point that is an area used according to an operation in a LCT header of a second pattern.

16. The transmitting device according to claim 13, wherein the first signaling data is acquired from a server through a network.

17. The transmitting device according to claim 13, wherein the first signaling data includes index information of the session of the first layer.

18. The transmitting device according to claim 13, wherein the first signaling data is Service Channel Signaling (SCS) or an Electronic Service Guide (ESG), and a common IP address is assigned to the components and the SCS configuring a specific service transmitted using the session of the first layer.

19. The transmitting device according to claim 12, wherein the filtering information is arranged in a TOI of the LCT header.

20. The transmitting device according to claim 12, wherein the filter information represents the filtering condition set for each of the plurality of types of the first signaling data.

21. A transmission method of a transmitting device, the transmission method comprising:

acquiring one or a plurality of components configuring a service;

acquiring first signaling data; and transmitting the first signaling data together with the components via a digital broadcast signal transmitted using an Internet Protocol (IP) transmission method, wherein the digital broadcast signal includes a Layered Coding Transport (LCT) packet, in which the first signaling data is stored and that is transmitted in a first layer that is higher than an IP layer of a protocol of the IP transmission method, a LCT header of the LCT packet includes filtering information used to determine whether to extract the packet for processing the first signaling data, the LCT packet is transmitted using a session of the first layer, the filtering information includes compression information representing compression/no-compression of the first signaling data, filter information representing a filter condition of the first signaling data, and version information representing a version of the first signaling data, and the filter information indicates which of a plurality of types of the first signaling data is contained in the first signaling data.

* * * * *